United States Patent [19]
Ogata et al.

[11] Patent Number: 5,847,721
[45] Date of Patent: Dec. 8, 1998

[54] RECORDING APPARATUS AND METHOD

[75] Inventors: Nobuhiko Ogata, Tokyo; Kiyohisa Sugishima, Yokohama, both of Japan

[73] Assignee: Canon Kabushiki Kaisha, Tokyo, Japan

[21] Appl. No.: 610,879

[22] Filed: Mar. 5, 1996

[30] Foreign Application Priority Data

| Mar. 6, 1995 | [JP] | Japan | 7-045536 |
| Mar. 8, 1995 | [JP] | Japan | 7-048567 |
| May 2, 1995 | [JP] | Japan | 7-108531 |

[51] Int. Cl.$^6$ .............................. H04N 1/40; B41J 29/38
[52] U.S. Cl. ............................... 347/9; 347/41; 358/454; 358/533
[58] Field of Search ................... 347/9, 12, 15, 347/3, 41; 358/296, 298, 533, 454

[56] References Cited

U.S. PATENT DOCUMENTS

| 4,272,771 | 6/1981 | Furukawa | 346/75 |
| 4,967,203 | 10/1990 | Doan et al. | 347/41 |
| 5,300,950 | 4/1994 | Lopez et al. | 347/41 |
| 5,429,441 | 7/1995 | Schulz et al. | 400/124.04 |
| 5,432,617 | 7/1995 | Sugishima | 358/435 |
| 5,583,550 | 12/1996 | Hickman et al. | 347/41 |
| 5,625,391 | 4/1997 | Hirabayashi et al. | 347/41 |

FOREIGN PATENT DOCUMENTS

| 0522980 | 1/1993 | European Pat. Off. . |
| 0546853 | 6/1993 | European Pat. Off. . |
| 0578434 | 1/1994 | European Pat. Off. . |
| 0597714 | 5/1994 | European Pat. Off. . |
| 0633139 | 1/1995 | European Pat. Off. . |
| 4141736 | 6/1993 | Germany . |
| 61-121658 | 6/1986 | Japan . |
| WO 9217340 | 10/1992 | WIPO . |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

A recording apparatus includes a recording unit having a nozzle line comprising a plurality of nozzles arranged along a sub-scan direction for recording a band having a record width corresponding to a length of the nozzle line onto a recording medium in accordance with an input image signal by discharging ink from the nozzles along a main scan direction orthogonal to the sub-scan direction, a transport unit for intermittently transporting the recording medium in the sub-scan direction, and a control unit for controlling the drive of the recording unit and the transport unit. The control unit sets a transport distance of the recording medium by the transport unit to a distance smaller than the record width when the image to be recorded on the recording medium comprises a plurality of bands. Each of the bands has at least one end having an image pattern complement to an image pattern at an end of adjacent band along the sub-scan direction. The length of the end in the sub-scan direction is equal to a difference between the record width and the transport distance.

47 Claims, 32 Drawing Sheets

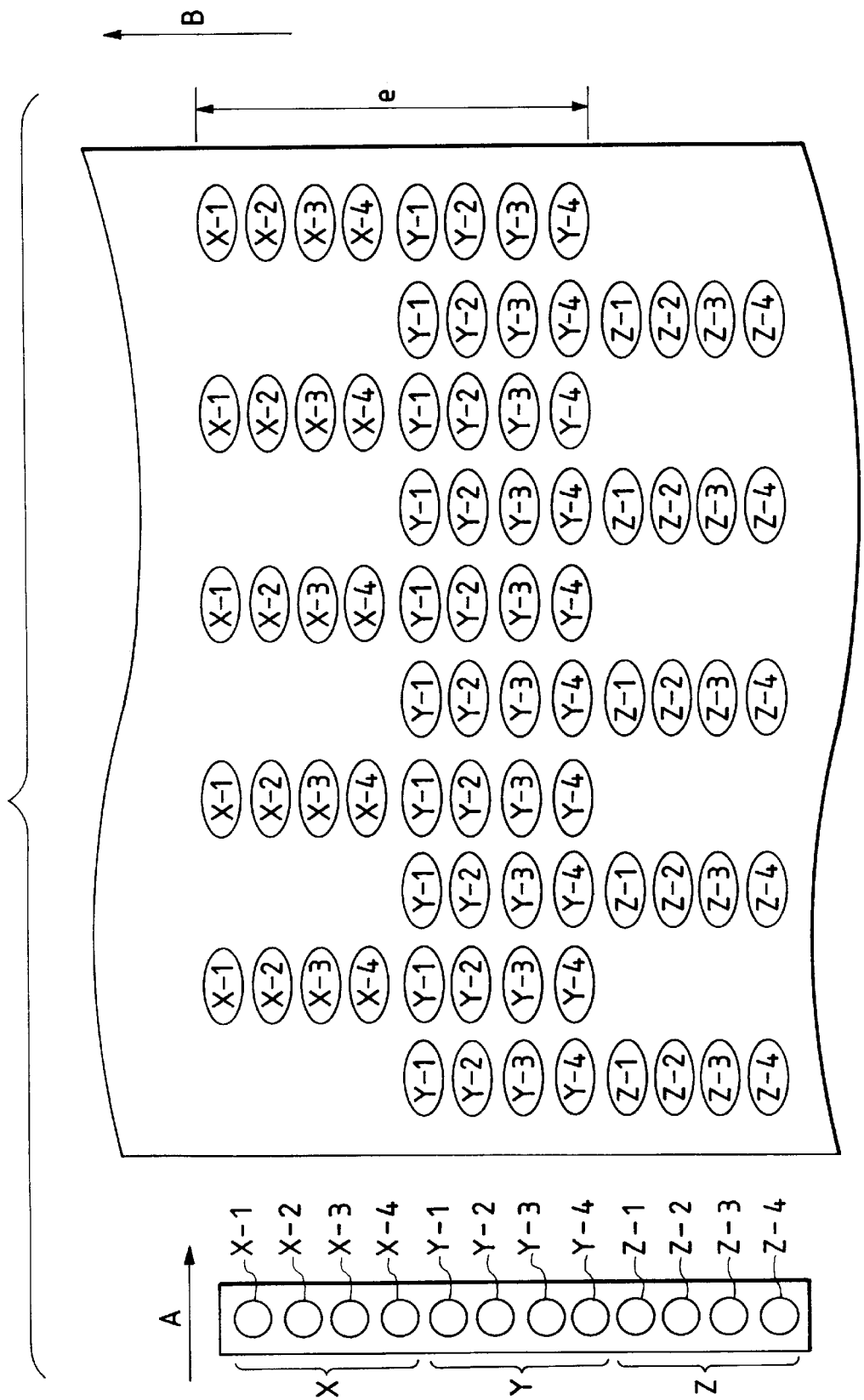

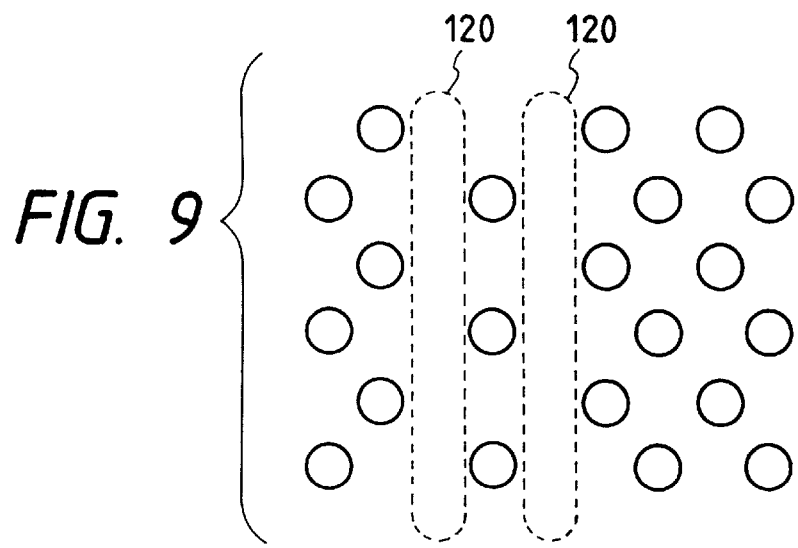
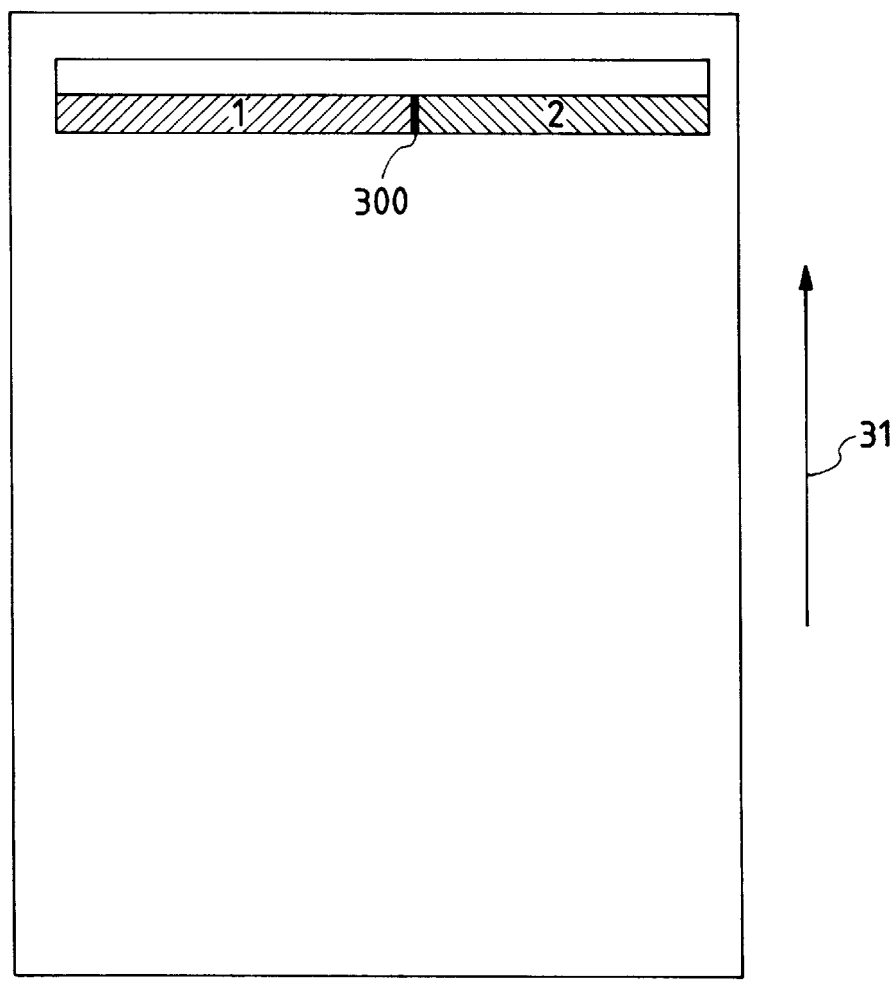

LOW ← DENSITY → HIGH

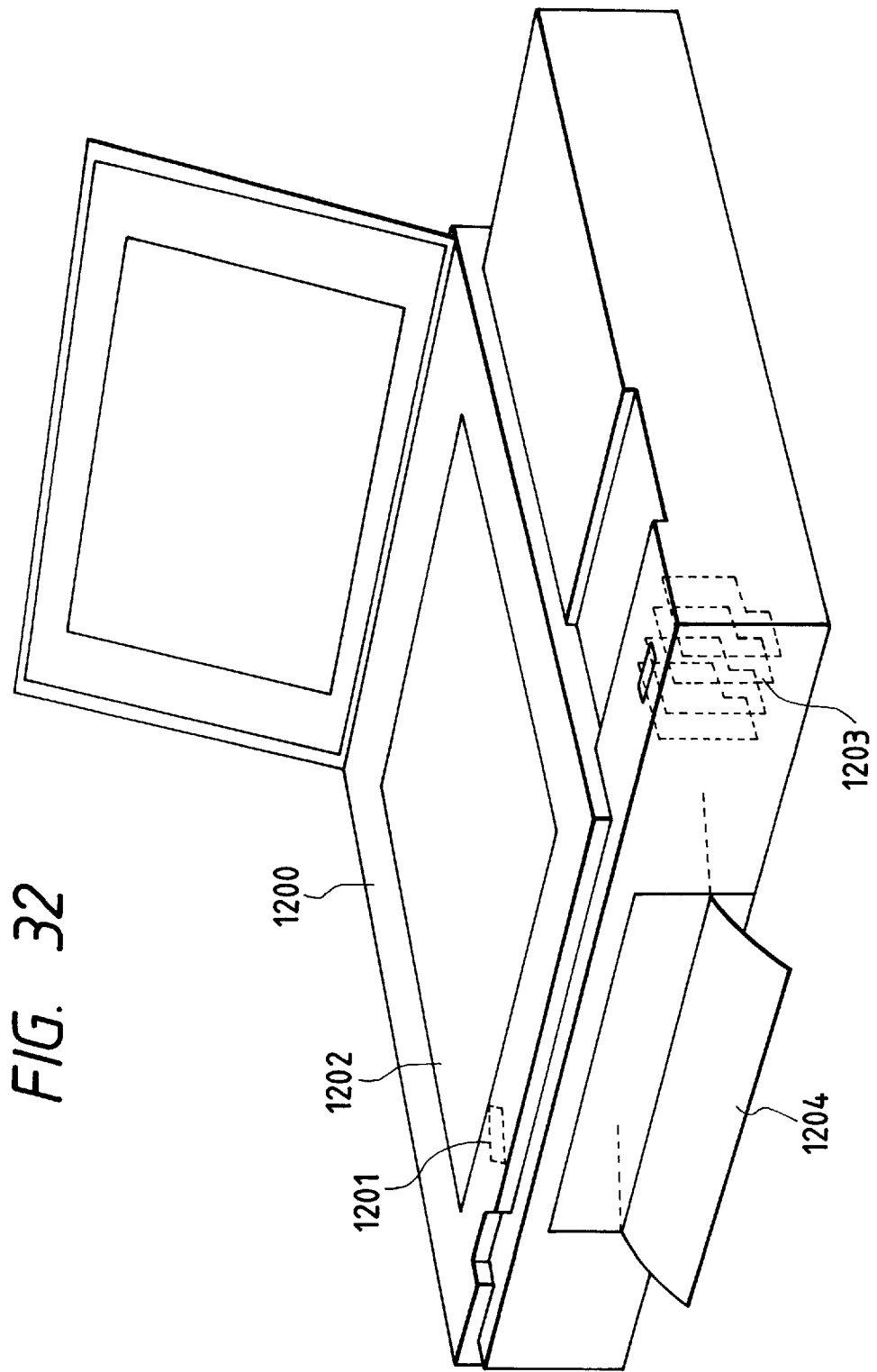

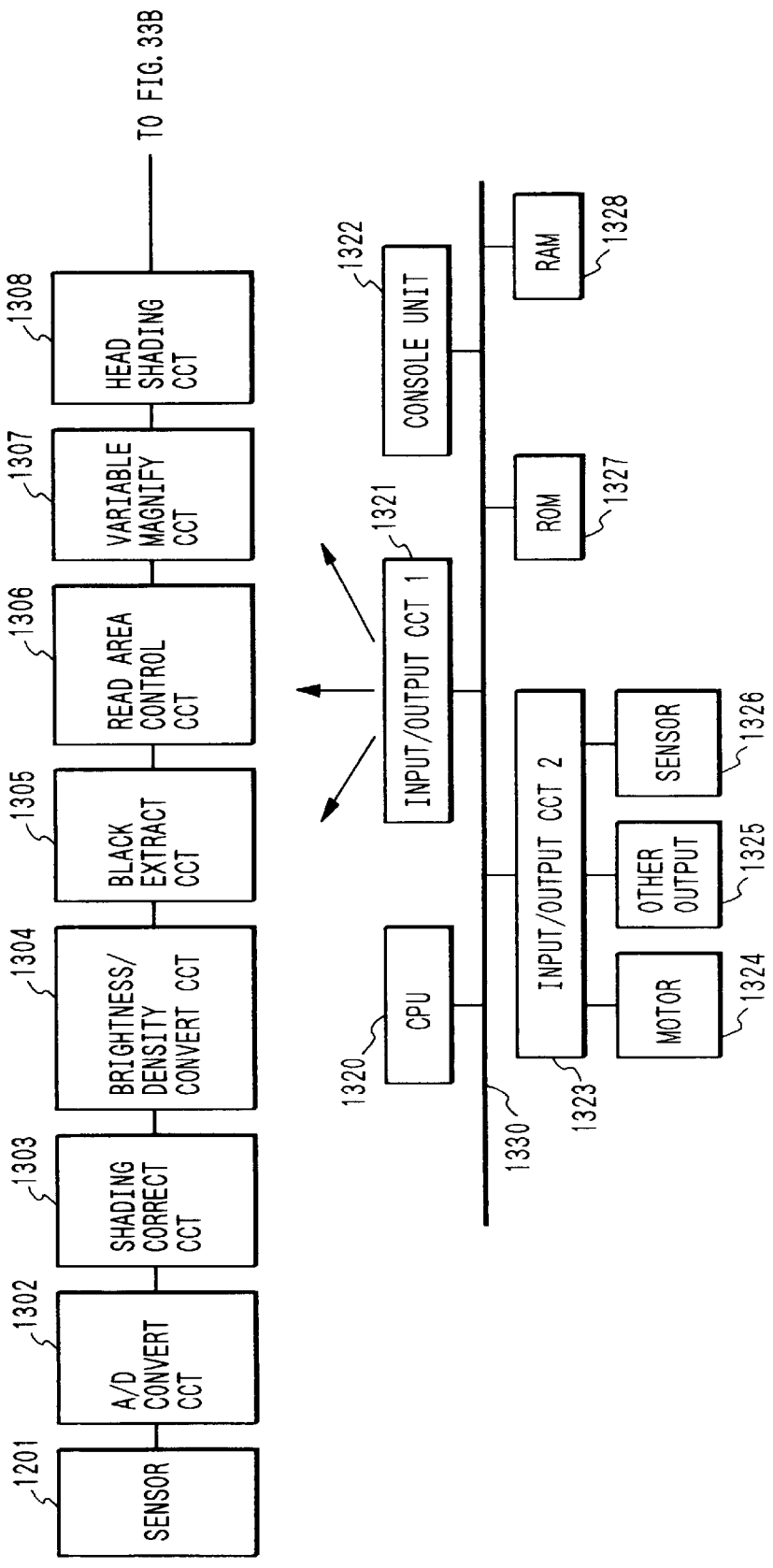

RECORDING APPARATUS AND METHOD

BACKGROUND OF THE INVENTION

1. Field of the Invention

The present invention relates to recording apparatus and method.

2. Related Background Art

An ink jet recording apparatus for printing (recording) an image by discharging ink to a recording medium has been known as an image recording apparatus.

The ink jet recording apparatus is a non-impact type recording apparatus and characterized by small noise and easiness of recording a color image by the use of multiple colors, and it has been recently becoming popular rapidly.

FIG. 38 shows a schematic perspective view of a prior art ink jet recording apparatus.

In FIG. 38, a rolled recording medium 5 is fed past convey rollers 1 and 2 and pinched by a feed roller 3 and fed in a direction f as a sub-scan motor 15 coupled to the feed motor 3 is driven. Guide rails 6 and 7 are arranged in parallel across the recording medium 5 and a recording head 9 mounted on a carriage 8 scans laterally. Four color heads 9Y, 9M, 9C and 9Bk for yellow, magenta, cyan and black each having a plurality of ink discharge ports arranged are mounted on the carriage 8 and four color ink tanks are arranged correspondingly thereto.

The recording medium 5 is intermittently fed by a recording width of the recording head 9, and recording head 9 scans in a direction P to discharge ink droplets in accordance with a binary image signal while the recording material 5 stops.

In such an ink jet recording apparatus, a characteristic of the recording medium is important, and particularly a spread or blur characteristic of the ink on the recording medium imparts a significant affect to an image quality.

A spread factor (or blur rate) has been known as an index to represent the spread characteristic of the ink to the recording medium. It indicates a magnification factor of a diameter of an ink droplet on the recording medium relative to that of an ink droplet discharged from an ink jet nozzle and is given by:

Spread factor=(dot diameter on the recording medium)/(diameter of discharged ink droplet)

For example, when a diameter of a flying ink droplets is 30 μm and a dot of 90 μm is formed on the recording medium, the spread factor of that recording medium is 3.0.

For a recording medium having a small spread factor, an image density is low and it is difficult to attain a massive and high grade image.

On the other hand, for a recording medium having a high spread factor, the image density is high but the following problems occur.

In a serial scan type ink jet apparatus as shown in FIG. 38, the recording head 9 having a plurality of ink discharge ports arranged is scanned in a direction A to sequentially repeat the image recording of a width d in the order of (1), (2) and (3) as shown in each of FIGS. 39A and 39B. The width d is determined by the number of discharge ports of the head and the recording density, and when the number of discharge ports is 256 and the recording density is 400 dots/inch (dpi), it is $$256 \times 25.4/400 = 16.256 \text{ mm}$$

When the amount of ink recorded is small, the absorption of the ink by the recording medium is sufficient and the width of the recorded image is substantially equal to the record width d. Thus, by main-scanning the recording head in the direction A after sub-scanning it by d in the direction B, the joint for each record scan does not cause a problem on the image as shown in FIG. 39A.

However, when an image of a high density area, that is, an area having a large amount of ink discharged onto the recording medium is to be recorded, a recording medium having a high spread factor cannot sufficiently absorb the ink and the ink spreads laterally such that the recorded image width becomes d+Δd. Assuming that the sub-scan width of the recording head in the direction B is d, the images overlap with the width of Δd and a black stripe appears in this area as shown in FIG. 39B. On the other hand, when the scan line width in the direction B is d Δd, a white stripe may appear in a low density area where the amount of discharged ink is small.

The spread Δd of the image width in the high density area changes with the spread factor of the recording medium and the amount of ink discharged to the recording medium, and the larger the spread factor is or the larger the amount of ink is, the larger is Δd. Accordingly, in order to prevent the black stripe from appearing, it is necessary to use the recording medium having a small spread factor or reduce the amount of ink used for recording. In this case, however, the image quality is lowered and the massive and high quality image is not attained.

In order to solve the above problem, a multi-scan system may be used to eliminate the black stripe. A printing method representing the feature of the multi-scan system is shown in FIG. 40. In general, in the multi-scan system, a head 1 comprises three parts X, Y and Z having nozzles X-1 to X-4, Y-1 to Y-4 and Z-1 to Z-4, respectively.

In the first scan, an image is printed with the ⅓ thinning in an area Z' on a sheet by the part Z of the head 1. Then, the sheet is sub-scanned by d in the direction B and dots thinned by ⅓ and thinned by the part Z are printed by the part Y of the head in an area Y'. Further, the sheet is sub-scanned by d in the direction B and dots thinned by the parts Y and Z are printed in an area X'. Since the printing is made such that the dots printed by the same nozzle do not continuously appear in the direction A, the disturbance of the image caused by the fluctuation of the ink droplets when they are discharged is not prominent.

However, since the multi-scan system is applied to all nozzles in the prior art, a time required to form an image is longer than that for the conventional serial scan type and it cannot meet the market needs of high speed print output.

SUMMARY OF THE INVENTION

It is an object of the present invention to provide improved recording apparatus and method.

It is another object of the present invention to provide recording apparatus and method which can eliminate a black stripe due to a spread of ink and stably produce a high quality image.

It is still another object of the present invention to provide recording apparatus and method which can stably produce a high quality of image free from irregularity of density such as black stripe or white stripe without regard to a type of recording medium.

It is still another object of the present invention to provide recording apparatus and method which can stably produce a high quality of image free from irregularity of density without regard to image data.

It is still another object of the present invention to provide recording apparatus and method which can stably produce a high quality of image free from irregularity of density in a short recording time.

It is still another object of the present invention to provide recording apparatus and method which can prevent the occurrence of irregularity of density such as a black stripe and produce a high quality of image by selecting an image processing pattern in accordance with a manner of spread of ink on the recording medium or image data.

It is still another object of the present invention to provide recording apparatus and method which determine at least one of a width of a boundary area on which edges of two band patterns overlap, a pixel pattern recorded in one scan and a density of the boundary area, in accordance with an input image signal or a count of the input image signal.

It is still another object of the present invention to provide recording apparatus and method which determines at least one of the width of the boundary area, the pixel pattern recorded in one scan and the density of the boundary area, in accordance with a color of the band to be recorded.

It is still another object of the present invention to provide recording apparatus and method which determines at least one of the width of the boundary area, the pixel pattern recorded in one scan and the density of the boundary area, in accordance with the type of the recording medium.

It is still another object of the present invention to provide recording apparatus and method in which the boundary area density exhibits a density gradient toward a predetermined direction from the end of the boundary area of the band.

The above and other objects of the present invention will become apparent from the following description and the accompanying drawings.

BRIEF DESCRIPTION OF THE DRAWINGS

FIG. 4 shows an order of use of nozzles in the embodiment,

FIG. 9 shows an arrangement of pattern in the third embodiment, FIG. 10 illustrates the multi-scanning of nozzles at an end of a head in a fourth embodiment of the present invention.

FIG. 32 shows a perspective view of a construction of the copying apparatus in the fifteenth embodiment of the present invention, FIG. 33 which comprised of FIGS. 33A and 33B shows a block diagram of a configuration of a controller and an image processing unit of the copying apparatus in the fifteenth embodiment of the present invention.

DETAILED DESCRIPTION OF THE PREFERRED EMBODIMENTS

The preferred embodiments of the present invention are now explained in detail with reference to the accompanying drawings.

The term record as used herein includes the imparting of ink (printing, image forming and dying) to any ink support member to which ink is imparted such as cloth, string, paper or sheet, and the present invention is applicable not only to information processing industries but also to a wide variety of industrial fields including apparel industries in which the ink support members to which ink is imparted such as cloth, string, paper and sheet are used. The term image is used in its broad sense and represents characters, pictures, photographs, patterns and marks.

Figure 1:
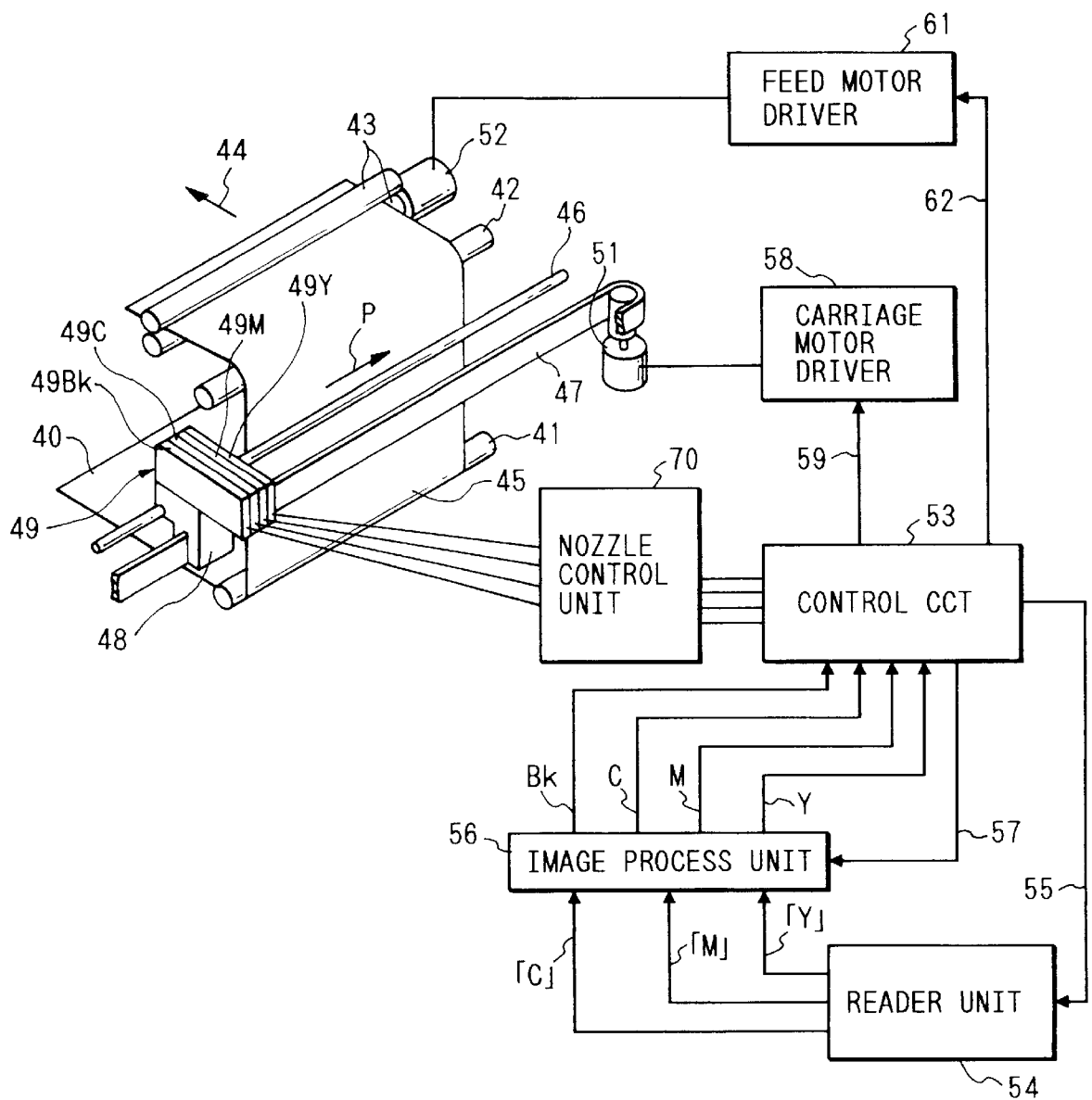
FIG. 1 shows a state of recording scan of a color image of an image recording apparatus in one embodiment of the present invention.

FIG. 1 shows a state of recording scan of a color image of an image recording apparatus in one embodiment of the present invention.

In FIG. 1, a record sheet passes through convey rollers 41 and 42 and is pinched by a feed roller 43. The feed roller (sheet feed roller) 43 is rotationally driven by a sheet feed motor 52 to feed a recording sheet 40 in a direction 44 as the sheet feed motor 52 is rotated by a sheet feed motor driver 61 in accordance with as sheet feed signal 62 from a control circuit 53.

A guide shaft 46 is arranged in parallel to the recording sheet 40 across a portion 45 of the recording sheet 40 and a head unit 49 comprising a plurality (four) of recording heads mounted on a carriage 48 is laterally reciprocated as a carriage motor driver.58 rotatably drive the carriage motor 51 in accordance with a scan signal 59 from the control circuit 53 so that the recording scan is performed. The carriage 48 is reciprocally moved through a timing belt 47 by the carriage motor (pulse motor) 51.

The head unit 49 on the carriage 48 has a cyan head 49C having cyan ink, a magenta head 49M having magenta ink, a yellow head 49Y having yellow ink and a black head 49Bk having black ink and an ink tank of a corresponding ink is connected to each of the heads. In the present embodiment, each head is of a type in which ink droplets are discharged by causing a change in status of ink by using a thermal energy.

The recording sheet 45 is intermittently fed and while the recording sheet stops, the recording head 49 (carriage 48) discharges ink droplets in accordance with an image signal while it scans in a direction P.

The control circuit 53 for controlling the recording operation outputs a reader control signal 55 for a reader unit (or a computer) 54. The reader unit 54 reads the image signal to be printed out in accordance with a request from the control circuit 53 and outputs it to an image processing circuit 56 as Y, M and C image signals. The image processing circuit 56 applies a predetermined image process to the Y, M and C image signals and outputs them as corresponding Y, M, C and Bk image signals.

The control circuit 53 receives the image signals from the image processing circuit 56 as density signals to be outputted by the recording apparatus and the data is sent to a nozzle selection unit 70 through the control circuit 53 and the image signals are sent to the recording head 49.

Figure 2:
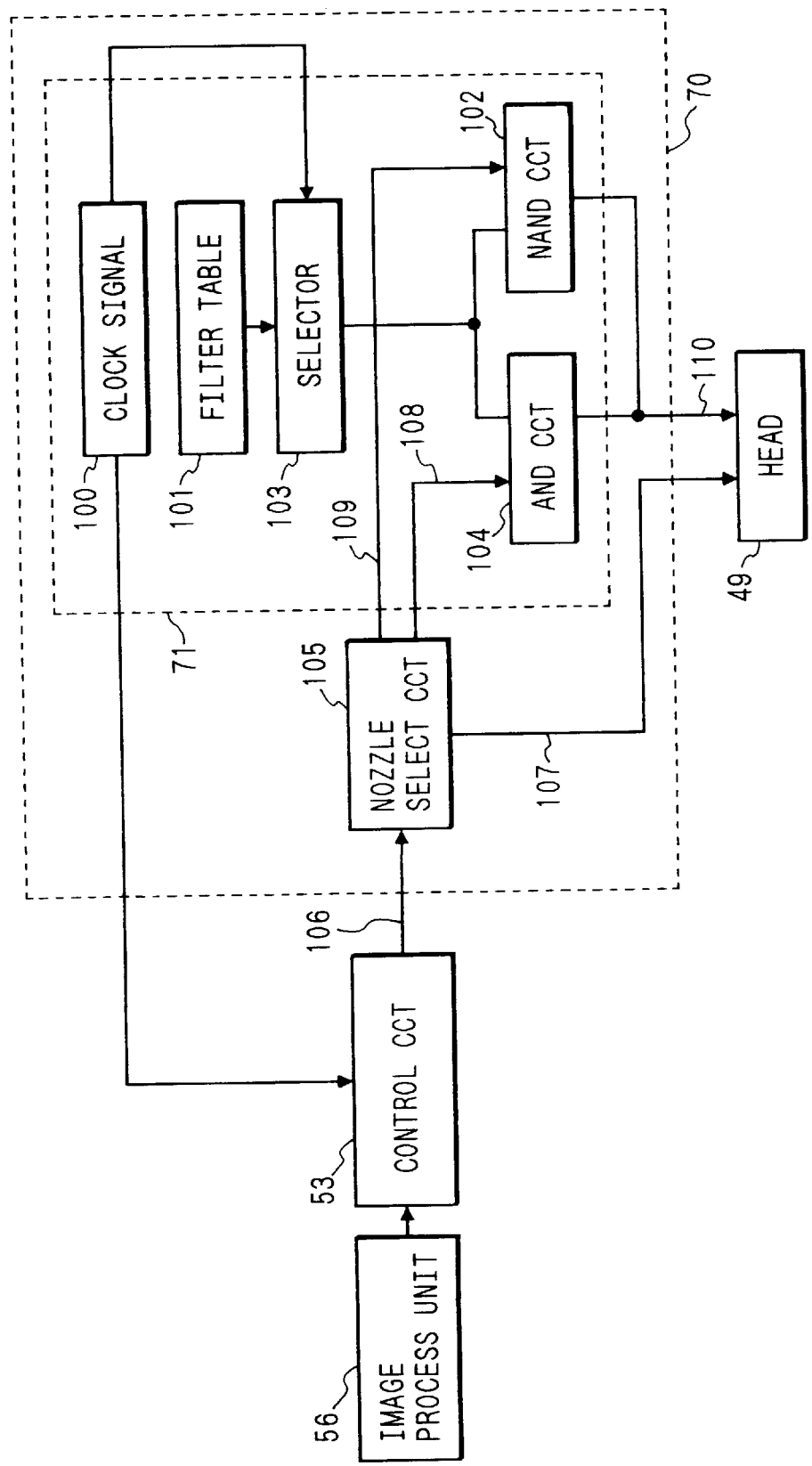
FIG. 2 shows a block diagram of a detailed configuration of a nozzle selection unit 70 of the embodiment shown in FIG. 1.

FIG. 2 shows a block diagram of a detailed configuration of the nozzle selection unit 70 of the present embodiment shown in FIG. 1.

The image signal 106 sent from the control circuit 53 is sent to a nozzle selection circuit 105 where it is divided into a nozzle signal 107 which is an image signal corresponding to nozzle portions not conducting the multi-scan and nozzle signals 108 and 109 which are image signals corresponding to nozzle portions conducting the multi-scan. The nozzle signal 108 which is the image signal corresponding to the nozzle portions conducting the multi-scan is an image signal of a Z block which conducts the multi-scan, and the nozzle signal 109 is an image signal of an X block.

The nozzle signal 107 which is the image signal of a Y block not conducting the multi-scan is supplied to the head 49. On the other hand, the nozzle signal 108 which is the image signal of the Z block conducting the multi-scan is outputted to an AND circuit 104 and the nozzle signal 109 which is the image signal of the X block is outputted to an NAND circuit 102.

A pattern generation unit 71 thins the image signal and generates interpolation data and conducts those processes by using a filter table 101 to be described later.

Figure 3:
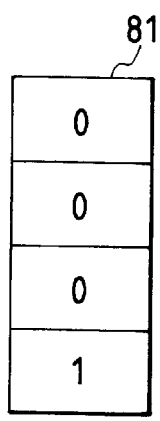
FIG. 3 shows a model of a filter table used in a pattern generation unit.

Referring to FIG. 3, the filter table used by the pattern generation unit 71 is explained below.

FIG. 3 shows a model of the filter table 101 used by the pattern generation unit 71. The table provides an effect of a filter to attain dot arrangement which does not cause a black stripe. For example, data is sequentially read by the filter table 101 by using a pattern 81. The image signal 108 synchronized with a clock signal 100 is also sequentially outputted and it is outputted to the head as the image signal 110 through the AND circuit 104.

For example, assuming that the pattern 81 is applied to the nozzles of the Z block for which the thinning is to be conducted, when the image signal of the Z-1 nozzle is sent from the nozzle selection circuit 105, '0' is sent from the filter table 101 to the AND circuit 104. Thus, the image signal 110 to the recording head 49 is '0' without regard to the image signal 108 and the printing is not conducted.

On the other hand, when the image signal of the Z-4 nozzle is sent from the nozzle selection circuit 105, '1' is sent from the filter to the AND circuit 104. Thus, the image signal 110 to the head is '1' without regard to the image signal 108 and the printing is conducted.

In the present embodiment, since the AND circuit 104 is used, the first three pixels are eliminated and the printing is conducted at the fourth pixel.

Further, the nozzles of the X block which conduct the interpolation of scan use the same filter as that used for the thinning and the image signal for the interpolation can be readily attained by the use of the NAND circuit 102. In the present embodiment, the data corresponding to the pattern 81 is applied to the NAND circuit 102 for the nozzles of the X block so that the printing is conducted by the Z-1 to Z-3 nozzles and the printing by the Z-4 nozzle is not conducted.

The order of use of the nozzles in the above operation is explained for a specific example. FIG. 4 shows the order of use of the nozzles in the present embodiment.

In the present embodiment constructed as described above, the printing is conducted in the X block to interpolate the dots thinned to one half in the pre-scan. On the other hand, in the Y block, the multi-scan is not conducted and the image is printed as it is. In the Z block, the dots are thinned to one half and printed. When one line of record is completed, the sheet feed motor 52 is driven to feed the sheet by e (eight-nozzle length). By repeating the above, the image is formed.

The number of nozzles for the multi-scan is not limited. The printing speed can be improved when Y>X=Z is satisfied.

Figure 5:
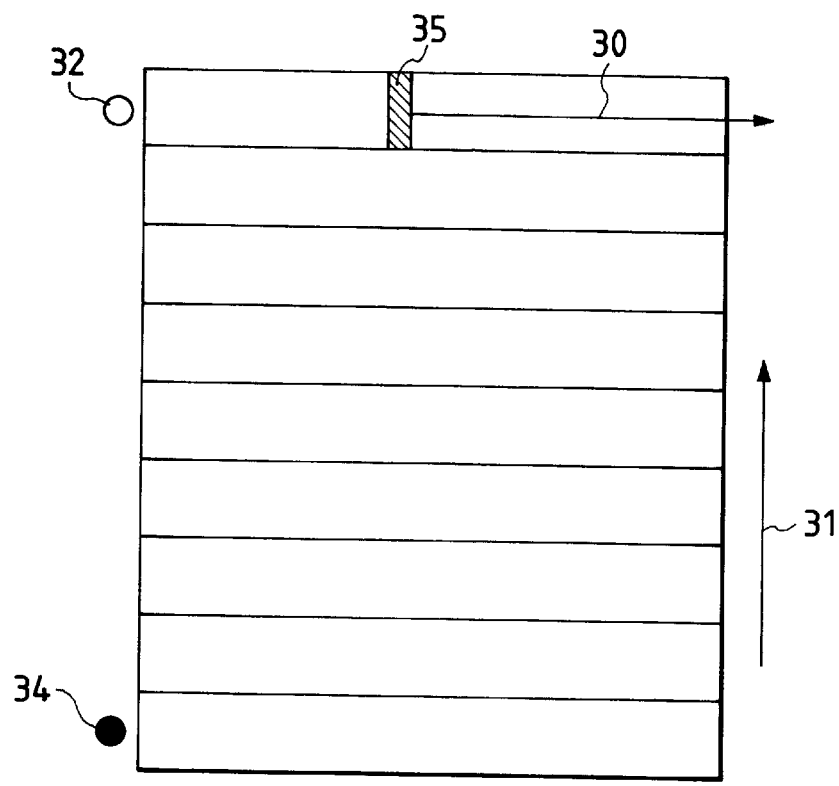
FIG. 5 shows a scan of a head in forming an image.

FIG. 5 shows scan of the head when one image is formed. In FIG. 5, an arrow 30 indicates a scan direction of the head 35, an arrow 31 indicates a feed direction of the sheet, and when the nozzles are used in the order of use shown in FIG. 4, the Z block conducts the thinning at a position 32 shown by 0 and the interpolation by the X block is not conducted but the image data sent is printed as it is.

Similarly, at a position 34 shown by ● the interpolation by the X block is conducted and the interpolation by the Z block is not conducted but the image data is printed as it is.

In accordance with the present embodiment, since the printing may be conducted without using specific nozzles, the discharge is free from fluctuation and a high quality of image is attained. Further, by conducting the recording scan by the four inks, cyan, magenta, yellow and black, a color image free from a black stripe can be formed.

Second Embodiment

A second embodiment of the present invention is now explained. The second embodiment is intended to attain a higher quality of image than that attainable by the first embodiment described above.

In the second embodiment, unlike the first embodiment, a plurality of filters for generating thinning and interpolation patterns are provided and a plurality of selectors are sequentially switched in the direction of scan to select the filters. Thus, a complex dot arrangement is attained with a number of filters.

Figure 6:
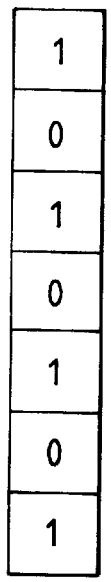
FIG. 6 shows an example of a filter for generating an interpolation pattern of a second embodiment of the present invention.
Figure 7:
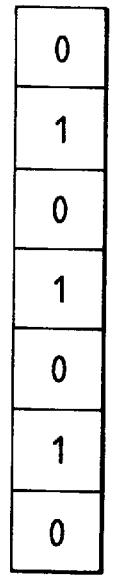
FIG. 7 shows an example of the filter for generating an interpolation pattern of the second embodiment of the present invention.

For example, when adjacent dots are printed in one scan for the recording medium having a high spread factor, the dots spread laterally so that the adjacent dots come closer to each other resulting in a black stripe. In the second embodiment, a filter table 101 which uses a filter as shown in FIG. 6 or FIG. 7 in the pattern generation unit 71 is used and they are sequentially switched in the scan direction so that the recording dots are arranged in a zig-zag (or checker) pattern and the adjacent pixels are printed in a plurality of runs.

In accordance with the second embodiment described above, the plurality of filters are switched to generate the thinning and interpolation patterns so that an optimum pattern which eliminates the black stripe is formed. Even if a fluctuation occurs in the discharge in a particular nozzle, the continuous printing by one nozzle may be prevented by simply changing the filter and a high quality of image is attained.

Third Embodiment

A third embodiment of the present invention is now explained. The third embodiment is intended to attain a higher quality of image than that attainable in the second embodiment. The third embodiment is the same configuration as that of the first embodiment shown in FIG. 1 except the construction of the nozzle selection unit 70 of FIG. 1.

Figure 8:
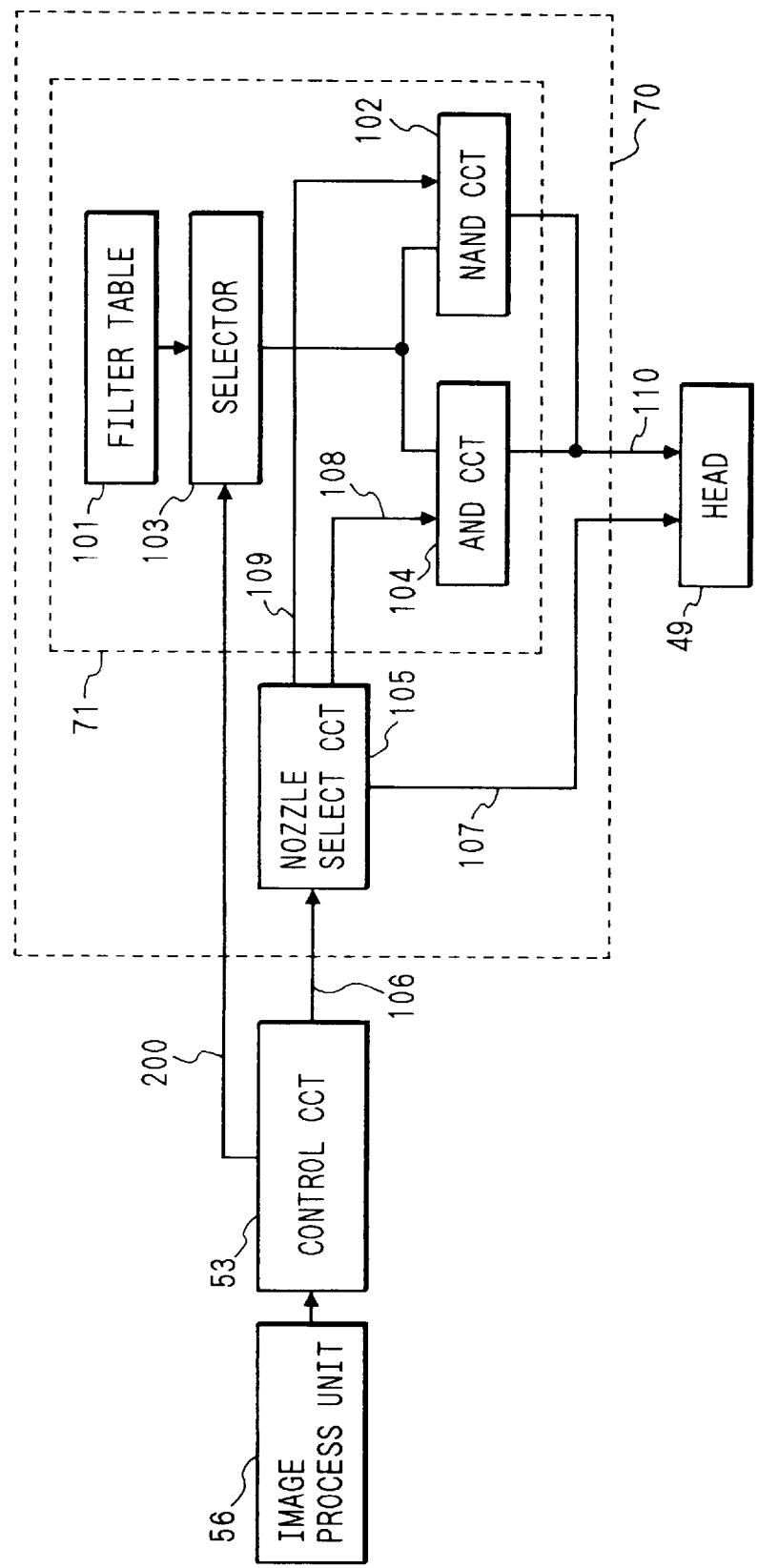
FIG. 8 shows a detailed block diagram of a nozzle selection unit in a third embodiment of the present invention.

FIG. 8 shows a detailed block diagram of the nozzle selection unit 70 of the third embodiment of the present invention. In the third embodiment, the selector 103 is switched by using a synchronization signal 200 outputted from the control circuit 53. In the first embodiment described above, since the data sent from the filter table 101 is sent in synchronism with the external clock signal 100, the filters, if there are a plurality of filters, are sequentially selected whether the image data is present or not and the same filter may be used by the adjacent pixels. In order to prevent it, in the third embodiment, the image synchronization signal 200 is used to control the switching of the selector 103.

FIG. 9 shows an arrangement of patterns in the third embodiment. In the third embodiment, the selector is not switched at a portion 120 in which no image signal is present but it is switched when the next image signal is sent for printing out. Thus, the adjacent pixels are always outputted by using different filters and the formation of the adjacent pixels by the same nozzle does not occur. Therefore, even if the failure of discharge or fluctuation of discharge occurs in a particular nozzle, it does not affect to the image and a high quality of image is attained.

Fourth Embodiment

A fourth embodiment attains a high quality printout by conducting the multi-scan of the nozzles at the end of the head as well as the multi-scan at the end of the image.

A digital copying apparatus has a variety of edit functions. In order to comply with those apparatus, in the fourth embodiment, the image signals sent in two runs are printed by dividing one scan area into two parts. A diagram of the print control in the fourth embodiment is same as that shown in FIG. 1. In the fourth embodiment, a part 1 shown in FIG. 10 is printed in a first scan and a part 2 is printed in a second scan, and there is no gap between the two scanned images and a stripe 300 appears at the joint of the first scan and the second scan.

Neighboring image data is eliminated immediately after the completion of the first scan and the image data at the start of the second scan is printed to interpolate the image data of the first scan. In this manner, the high quality of image free from the black stripe is attained.

Fifth Embodiment

In the first to fourth embodiments described above, a white stripe may appear or a black stripe may not be eliminated depending on the spread factor of the recording medium. In a fifth embodiment of the present invention, the filters for the thinning are prepared to fit to the recording media and they are selected so that the high quality of image free from the stripe for any recording medium is attained.

The fifth embodiment is now explained. In the fifth embodiment, the high quality of image is attained by using means for detecting the spread.

Figure 11:
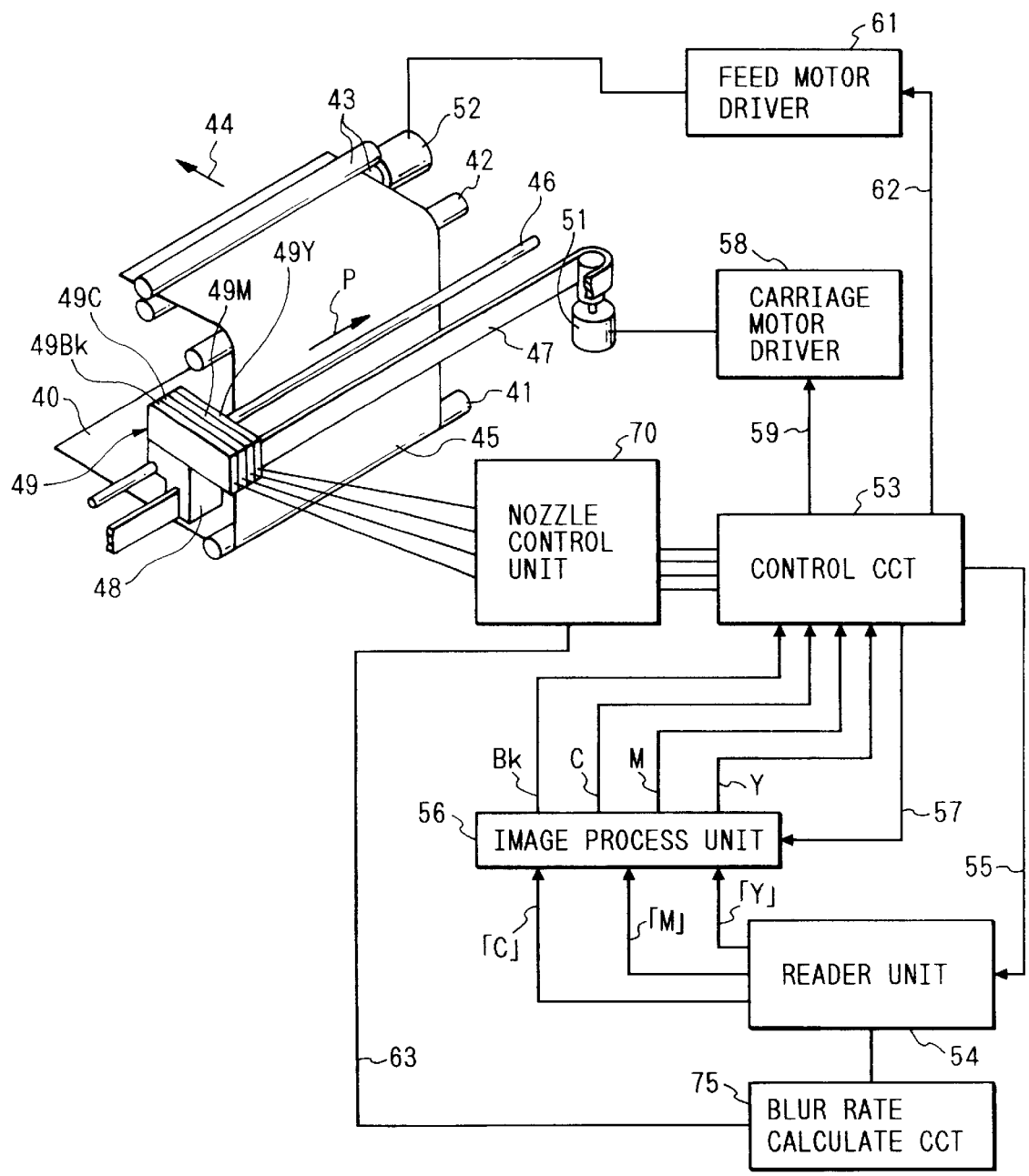
FIG. 11 shows a perspective view of a color ink jet recording apparatus and a control unit therefor in a fifth embodiment of the present invention.

FIG. 11 shows a perspective view of a color ink jet recording apparatus and a control unit therefor in the fifth embodiment of the present invention. In FIG. 11, the like elements to those of the first embodiment shown in FIG. 1 are designated by the like numerals and the detailed explanation thereof is omitted. In FIG. 11, in addition to the configuration of FIG. 1, a spread factor calculation circuit 75 for calculating a spread factor of ink when the ink is discharged to the recording medium is provided. The ink spread factor is calculated in the following manner.

Figure 12:
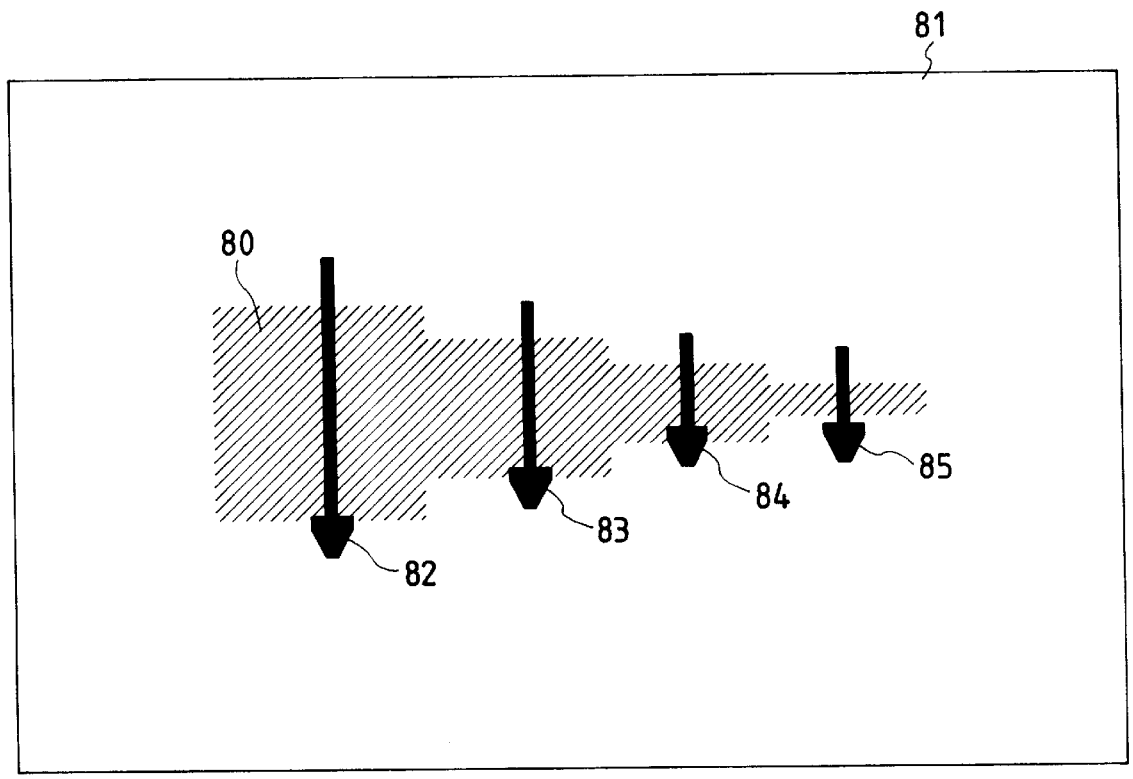
FIG. 12 shows an example of record pattern for calibrating parameters for recording on a record sheet in the fifth embodiment.

In FIG. 11, record patterns 80 for calibrating parameters having different widths at several densities are printed on a recording sheet 81 fed by the feed roller 43. FIG. 12 shows an example of the record pattern for calibrating the parameters recorded on the recording sheet 81.

The recording sheet 81 is mounted on a read position of the reader unit 54 and the read operation is started in the direction of 82, 83, 84 and 85.

FIGS. 13A to 13D show relations of the record pattern for calibrating the parameters to the input signal in the scan direction. Numerals 91a, 91b, 91c and 91d denote signals when the recording is made on a recording sheet which causes the spread or bleeding.

Comparing with the signals 91e, 91f, 91g and 91h for the recording sheet which does not cause the spread or bleeding, a boundary line between the non-printed area and the printed area is broader. X1 denotes a signal read from the recording sheet having no spread. The output signal is supplied to the spread factor calculation circuit 75 and the spread parameter D is defined as $$D = (X2-X1)/(X2) \qquad (1)$$

The spread parameter is calculated by the spread factor calculation circuit 75 and depending on the result thereof, a control signal 63 for selecting an optimum filter which allows the thinning method without causing the stripe from the plurality of filters is outputted so that the high quality of image free from the stripe is attained even if a change in the appearance of the stripe occurs due to a change in the spread by the change of an absorbing speed of the ink by the recording sheet or a change in the environment.

Figure 14A:
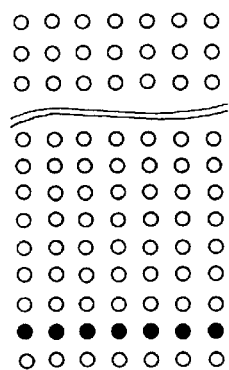
FIGS. 14A to 14C show examples of thinning method to prevent the occurrence of a stripe in the fifth embodiment.
Figure 14B:
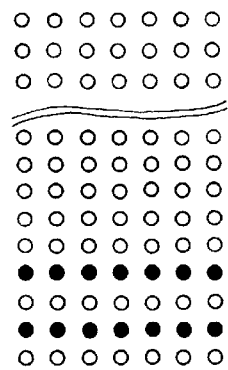
Figure 14C:
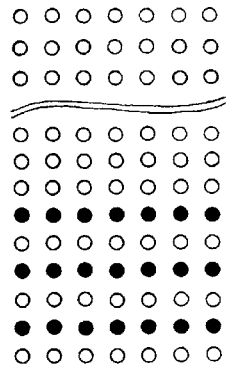
Figure 13A:
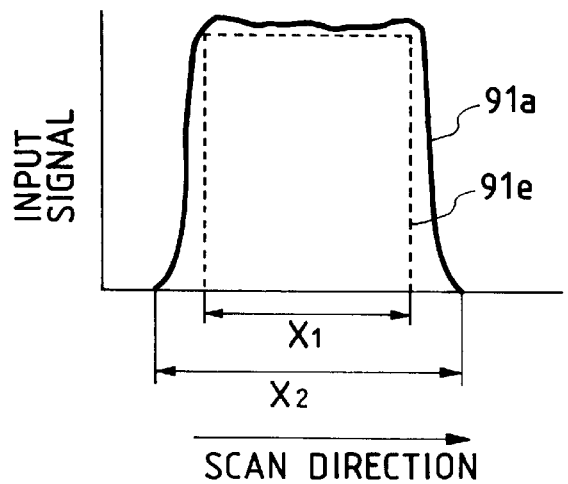
FIGS. 13A to 13D show relations of an input signal to a scan direction of the record pattern for calibrating the spread parameters in the fifth embodiment.
Figure 13B:
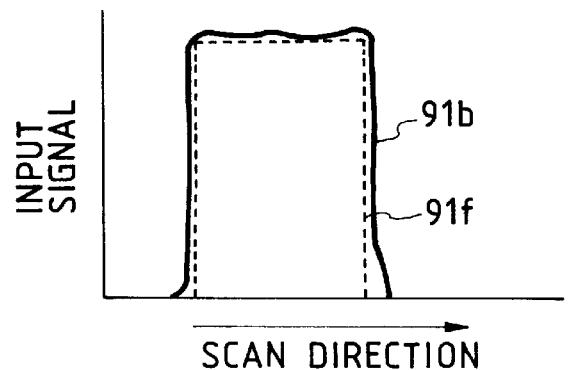
Figure 13C:
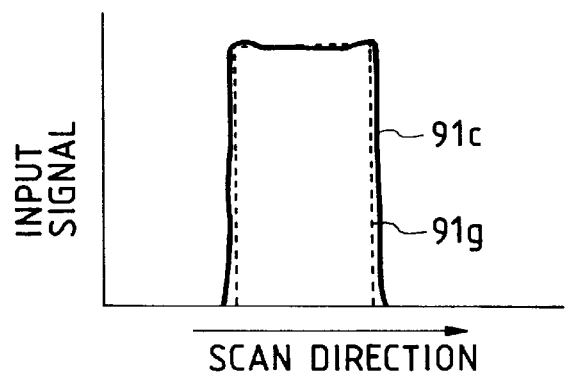
Figure 13D:
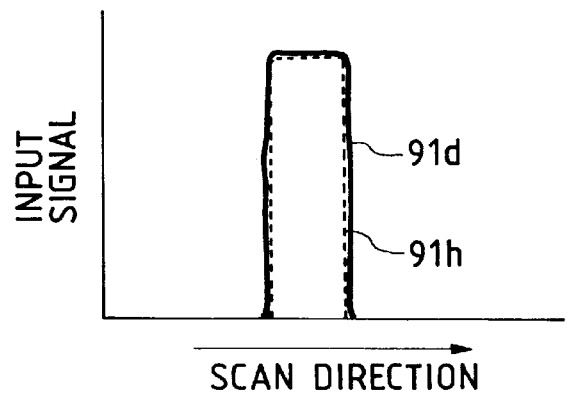

Examples of thinning method which do not cause the stripe are shown in FIGS. 14A to 14C. In the thinning methods shown in FIGS. 14A to 14C, control is made such that the area of thinning is gradually changed as the spread of the recording medium increases. By selecting one of the thinning methods shown in FIGS. 14A to 14C, a higher quality of image may be attained.

In accordance with the fifth embodiment described above, the appearance of the white stripe or the non-elimination of the white stripe is prevented even if the way of spread of the recording medium changes and the high quality of image free from the stripe is attained for any recording medium.

In the above embodiment, the filters for thinning are automatically changed although the present embodiment is not limited thereto but more appropriate filters for the recording medium may be provided and they may be manually switched to attain the high quality of image free from the stripe for any recording medium. By conducting the recording scan by four inks by this means, a color image free from a black stripe can be attained.

Sixth Embodiment

A sixth embodiment of the present invention is now explained. In the sixth embodiment, instead of selecting the filters as it is in the fifth embodiment, a filter is generated by using a spread parameter so that printout is attained by using an optimum filter without having a memory circuit for holding the filter table.

Figure 15:
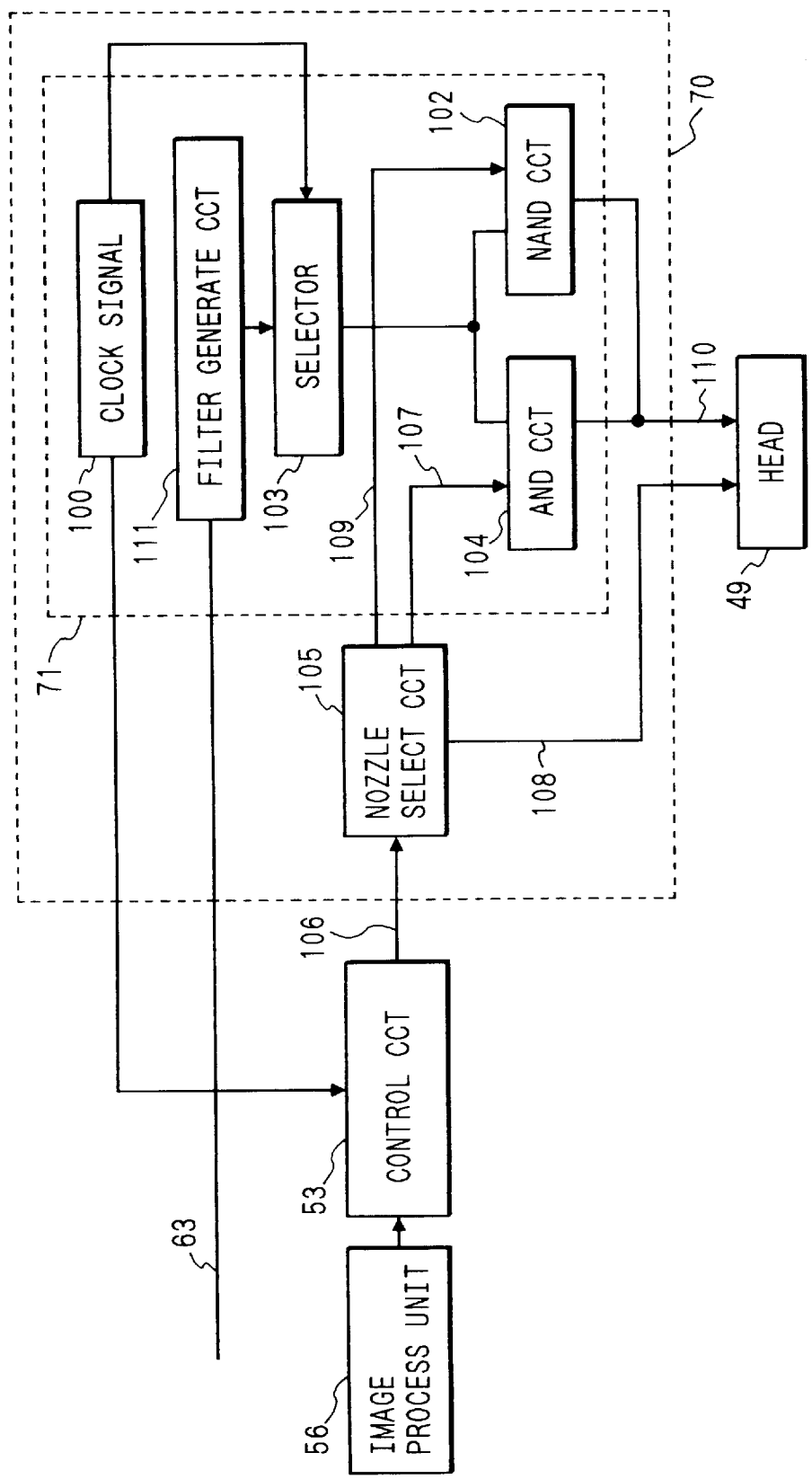
FIG. 15 shows a block diagram of a detailed configuration of a nozzle selection unit in a sixth embodiment of the present invention.

FIG. 15 shows a block diagram of a detailed configuration of the nozzle selection unit 70 in the sixth embodiment. In the sixth embodiment, instead of the filter table 101 of the first embodiment shown in FIG. 2, a filter generation circuit 111 is provided. Other details of configuration are similar to that of the fifth embodiment shown in FIG. 11 and the detailed explanation thereof is omitted.

In the above configuration, a spread parameter signal 63 from the spread factor calculation circuit 75 is sent to the filter generation circuit 111 which generates an optimum filter having a characteristic as shown in FIGS. 14A to 14C. Thus, the multi-scan may be conducted by using the generated optimum filter and the high quality of image is attained.

In accordance with the fifth and sixth embodiments, the black stripe at the end due to the spread of ink is eliminated even if the manner of spread is different from recording medium to recording medium and the high quality of image is stably attained.

Seventh Embodiment

A seventh embodiment of the present invention is now explained.

Figure 16:
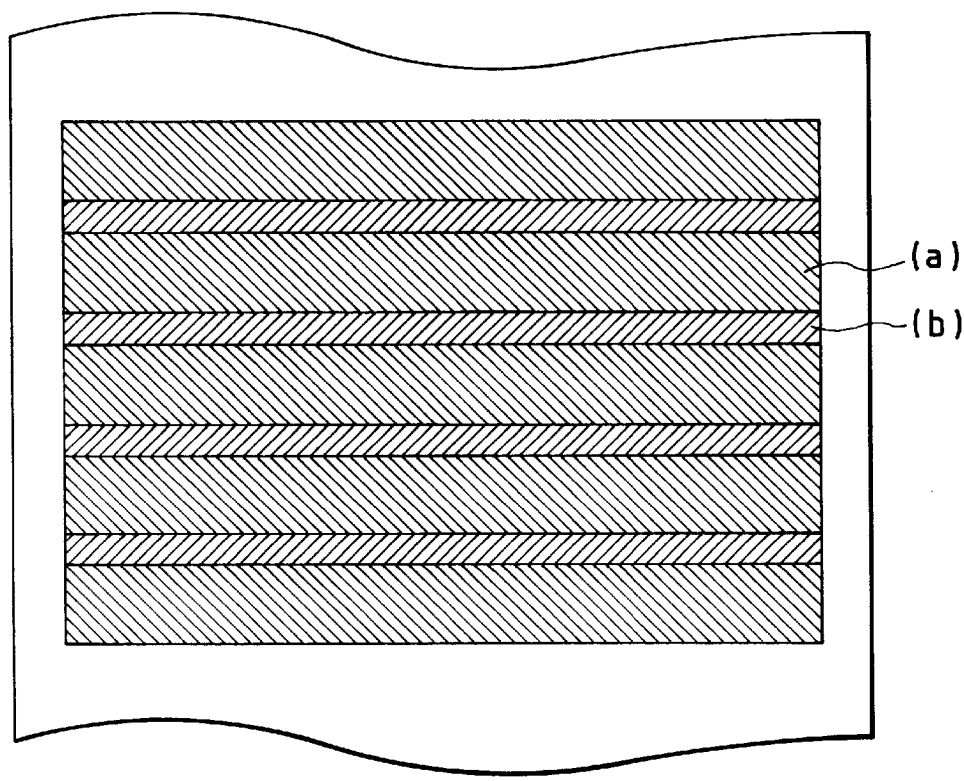
FIG. 16 shows an example of print when the multi-scanning is conducted for only nozzles at an end for each scan.

In the embodiments described above, the multi-scan is conducted only for the nozzles at the end for each scan. Thus, a difference in the density may appear between an area (a) in which normal printing is conducted and an area (b) in which the end multi-scan is conducted as shown in FIG. 16. This difference in the density is caused by a change in a depthwise position for holding the ink dye because of a difference in implantation time of the ink to the recording medium. Because of this phenomenon, the high quality of image is not attained although the end black stripe is eliminated. In the seventh embodiment, in order to solve the above problem, irregularity of color in the multi-scan area which changes for each recording medium is reduced by varying the input image data or the pulse applied to the recording head for the recording elements near the occurrence of the black stripe so that the high quality of image is attained.

Figure 17:
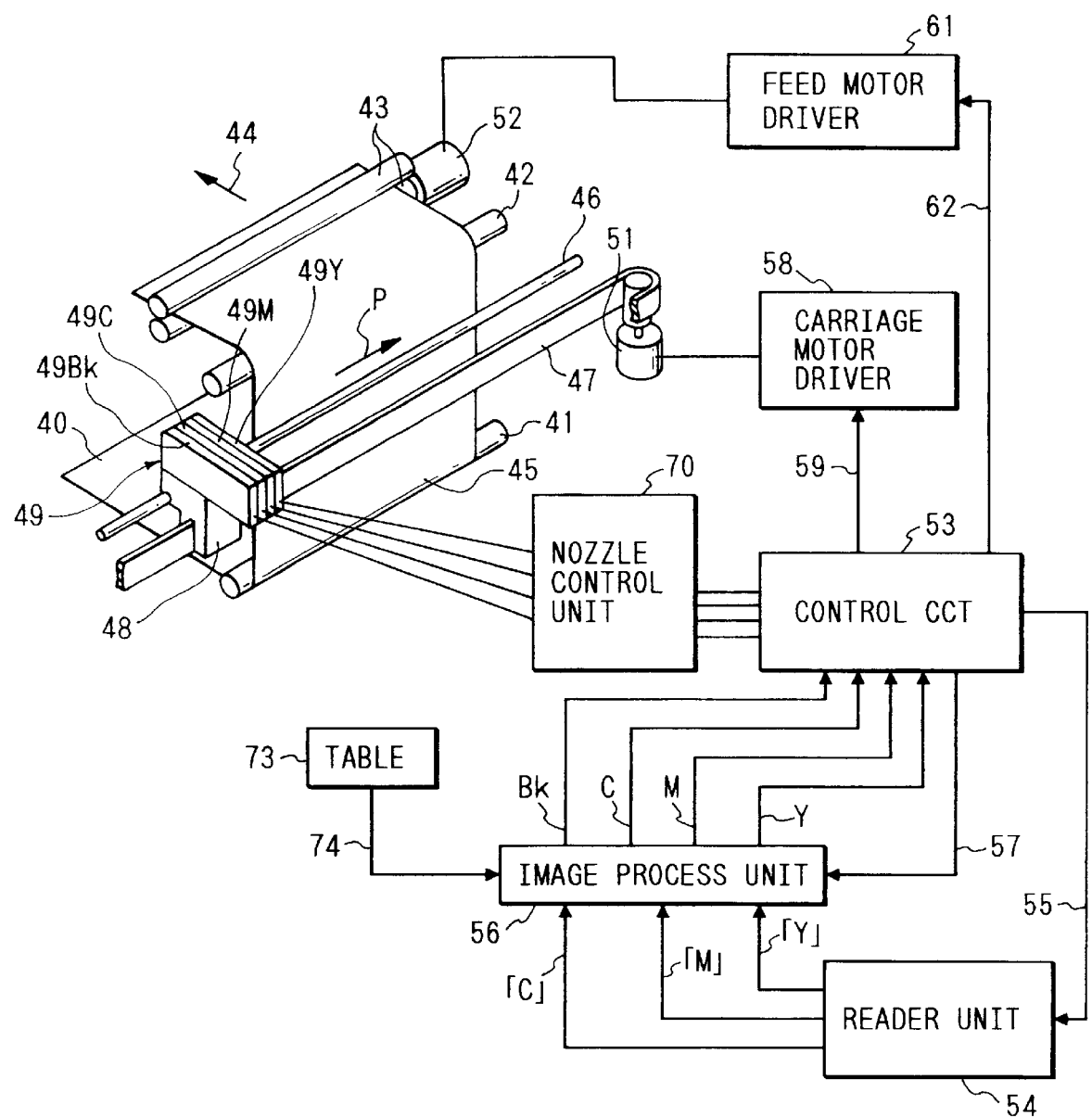
FIG. 17 shows a perspective view of a color ink jet recording apparatus and a control unit therefor in a seventh embodiment of the present invention.

FIG. 17 shows a perspective view of a color ink jet recording apparatus and a control unit therefor of the seventh embodiment of the present invention. In FIG. 17, the like elements to those of the first embodiment shown in FIG. 1 are designated by the like numerals and the detailed explanation thereof is omitted. In FIG. 17, in addition to the configuration of FIG. 1, a table 73 which stores control data for controlling the image output signal to reduce the image density of the multi-scan area is provided.

The order of use of the recording head 49 in the seventh embodiment is essentially same as that of the first embodiment shown in FIG. 4 and the scan of the head is that shown in FIG. 5. Further, the detailed configuration of the nozzle control unit 70 in the seventh embodiment is same as that of the third embodiment shown in FIG. 8. Thus, the explanation thereof is omitted and only the portions different from the above embodiments are explained below.

Figure 18:
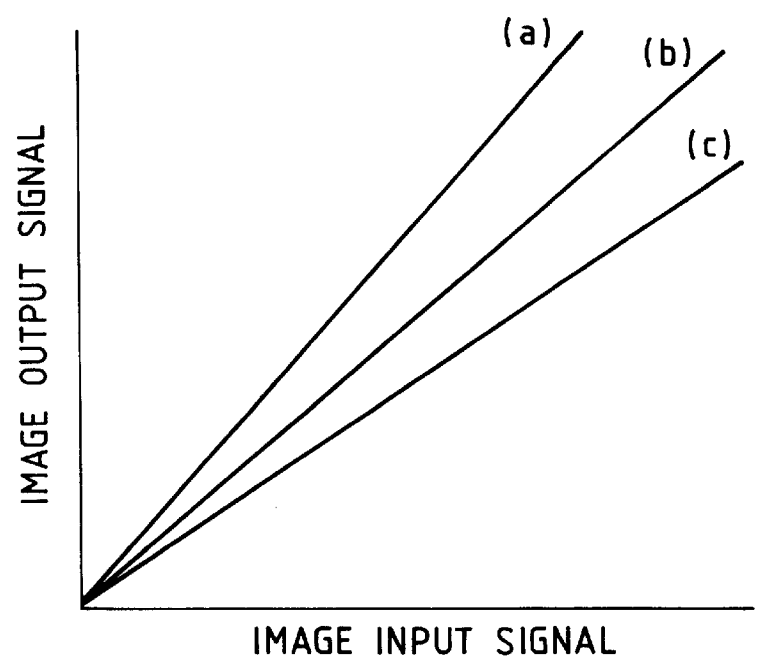
FIG. 18 shows an example of a model of table 73 in the seventh embodiment.

FIG. 18 shows an example of a model of the table 73 of the seventh embodiment. The table 73 provides an effect of filter for arranging dots such that a black stripe does not appear. The image processing circuit 56 controls the image output signal to lower the image density of the multi-scan area. For the multi-scan area, the image signal is sent from the table 73 to the image processing circuit 56. For example, a relation of the image input signal and the output signal as shown in FIG. 18 is applied only to the multi-scan area, and when the density of the end multi-scan area is high, the table (c) is used to conduct the printing with a lower density. The table 73 serves to reduce the change in the density due to the change in the absorption property of the ink and contains data of frequently used recording sheets.

In the seventh embodiment, an optimum table is selected from the tables registered in the table 73 and the image data for recording is generated by using the image input/output signal from the selected table 73 and it is sent to the control circuit 53 so that the high quality of image free from end density irregularity is attained without lowering the print speed.

By conducting the present operation for the recording scan with the four inks, cyan, magenta, yellow and black, a color image free from stripe may be formed.

In accordance with the seventh embodiment described above, even if a change in the spread occurs due to the change of the density of the image, the black stripe at the end due to the spread of the ink may be eliminated. Further, the irregularity of density caused by the partial multi-scan is suppressed and the stable high quality of image is attained.

Eighth Embodiment

In an eighth embodiment, a pulse for a discharge heater is controlled to control the amount of discharge of ink so that the density is varied to attain a similar effect to that of the seventh embodiment.

Figure 19:
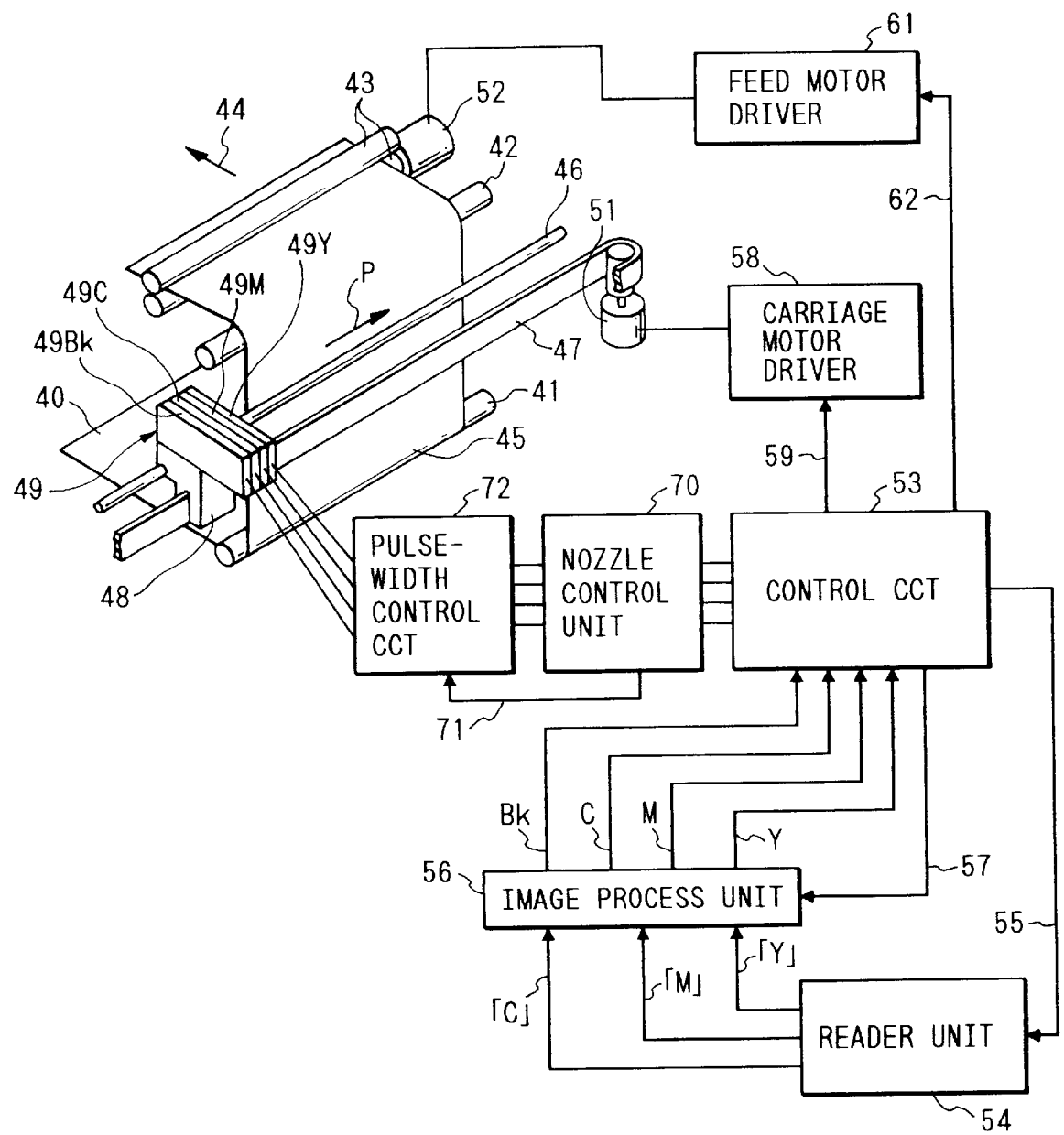
FIG. 19 shows a perspective view of a color ink jet recording apparatus and a control unit therefor in an eighth embodiment of the present invention.

FIG. 19 shows a color ink jet recording apparatus and a control unit therefor of the eighth embodiment of the present invention. In FIG. 19, the like elements to those of the first embodiment shown in FIG. 1 are designated by the like numerals and the detailed explanation thereof is omitted. In FIG. 19, in addition to the configuration of FIG. 1, a pulse width control circuit 72 is provided between the nozzle control unit 70 and the recording head 49 in order to lower the image density of the multi-scan area.

In the eighth embodiment, other configuration and the basic control are similar to those of the first embodiment and the explanation thereof is omitted and only those portions which are different from the above embodiment are explained below.

Figure 20A:
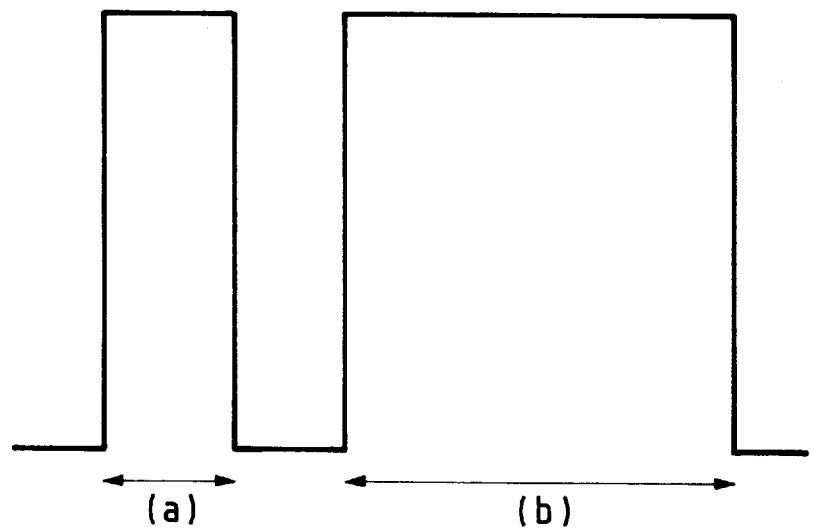
FIGS. 20A and 20B show application timing of a drive pulse to a recording head in the eighth embodiment.
Figure 20B:
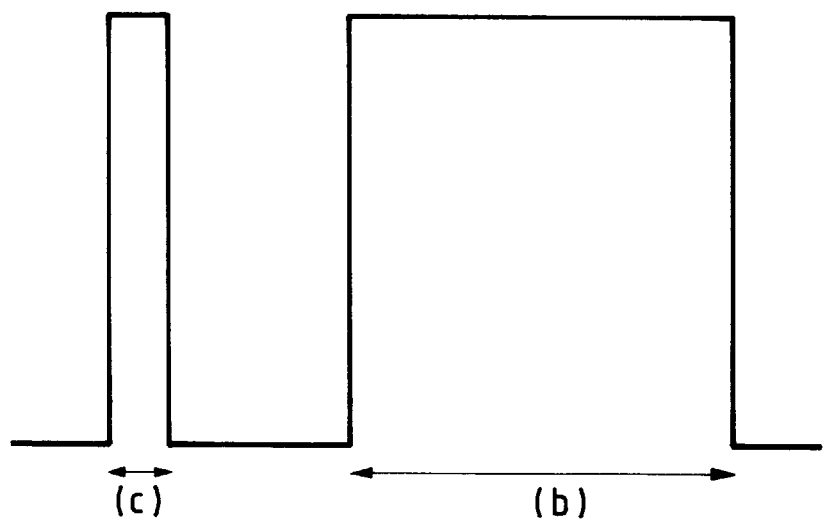

FIGS. 20A and 20B show timings for applying a drive pulse to the recording head 49. In general, the head drive pulse in the print mode comprises a main pulse (b) for discharging and a sub-pulse (a) as shown in FIG. 20A. In the eighth embodiment, the width of the sub-pulse (a) is varied for the nozzle which conducts the end multi-scan in order to vary the amount of ink discharged to vary the density.

When the end multi-scan is conducted, the control signal 71 is sent from the nozzle control circuit 70 to the pulse width control circuit 72 and the printing is conducted in accordance with the control signal 71. For the multi-scan area, a sub-pulse (c) shown in FIG. 20B ((c)<(a)) is used so that the density is lowered and the irregularity of density in the multi-scan area is suppressed.

In accordance with the eighth embodiment described above, when the end multi-scan is conducted, the sub-pulse (c) of FIG. 20B ((c)<(a)) is used by the pulse width control circuit 72 to reduce the density and suppress the irregularity of density in the multi-scan area.

Ninth Embodiment

A ninth embodiment is constructed to effectively suppress the occurrence of the irregularity of density in the end multi-scan area depending on the recording medium, as compared with the seventh and eighth embodiments described above.

In general, where a difference in the implantation time of ink is present, the irregularity of density occurs due to a difference of depthwise position at which the ink dye is held. This phenomenon occurs remarkably in a coated sheet having an ink absorption layer. Because of such a phenomenon, it is necessary to change the print method depending on the recording medium.

Figure 21:
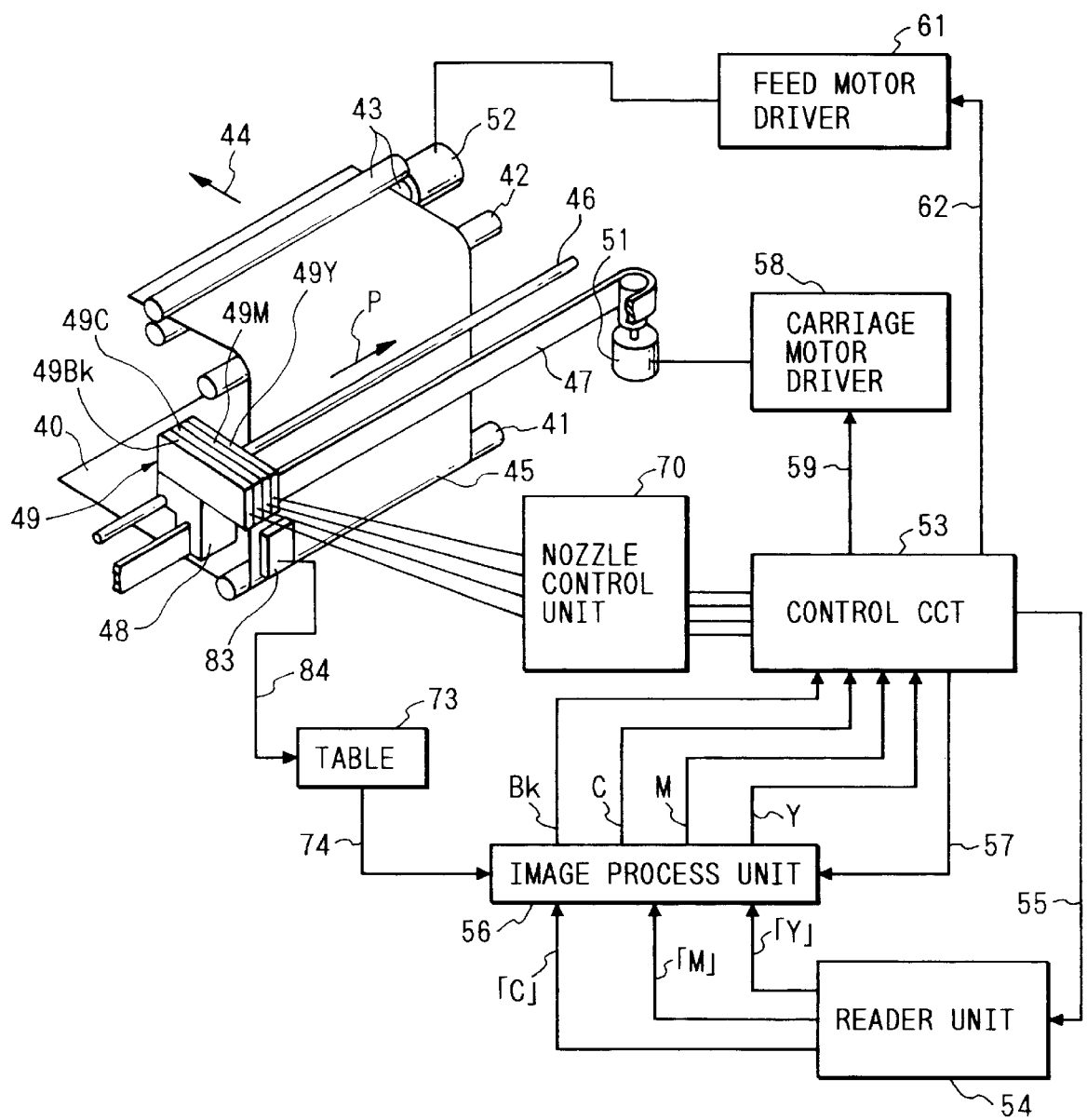
FIG. 21 shows a perspective view of a color ink jet recording apparatus and a control unit therefor in a ninth embodiment of the present invention.

FIG. 21 shows a perspective view of a color ink jet recording apparatus and a control unit therefor of the ninth embodiment of the present invention. In FIG. 21, the like elements to those of the eighth embodiment shown in FIG. 19 are designated by the like numerals and the detailed explanation thereof is omitted. In FIG. 21, in addition to the configuration of FIG. 19, a table 73 which holds a table shown in FIG. 18 and having the same function as that in the seventh embodiment and a medium detection unit 83 for detecting a medium by using an optical characteristic or a manual medium selection unit (not shown) are provided. A type signal 84 representing the medium type is sent from the medium detection unit 83 or the manual medium selection unit to the table 73, the table is selected in accordance with the signal, and the image signal 74 which suppress the irregularity of density is selected and fed back to the image processing circuit 56 to conduct the printing.

When a medium which causes a high density at the multi-scan area is selected, the input/output image signal shown by (c) in FIG. 18 is selected, and when a medium which causes a low density is selected, the image input/output signal (a) is selected so that the high quality of image free from irregularity is stably attained without regard to the medium.

The table to be selected is prepared for several types of sheets which are frequently used and a plurality of tables are prepared so that the irregularity of density is corrected even if there is a difference in the absorption of the respective sheets. By selecting those, the high quality of image free from irregularity of density is attained.

By the above control, the occurrence of the irregularity of density in the end multi-scan area depending on the recording medium is effectively suppressed.

Tenth Embodiment

In a tenth embodiment, control to suppress the irregularity of density for each medium is added to the eighth embodiment to attain the high quality of image free from the irregularity of density.

Figure 22:
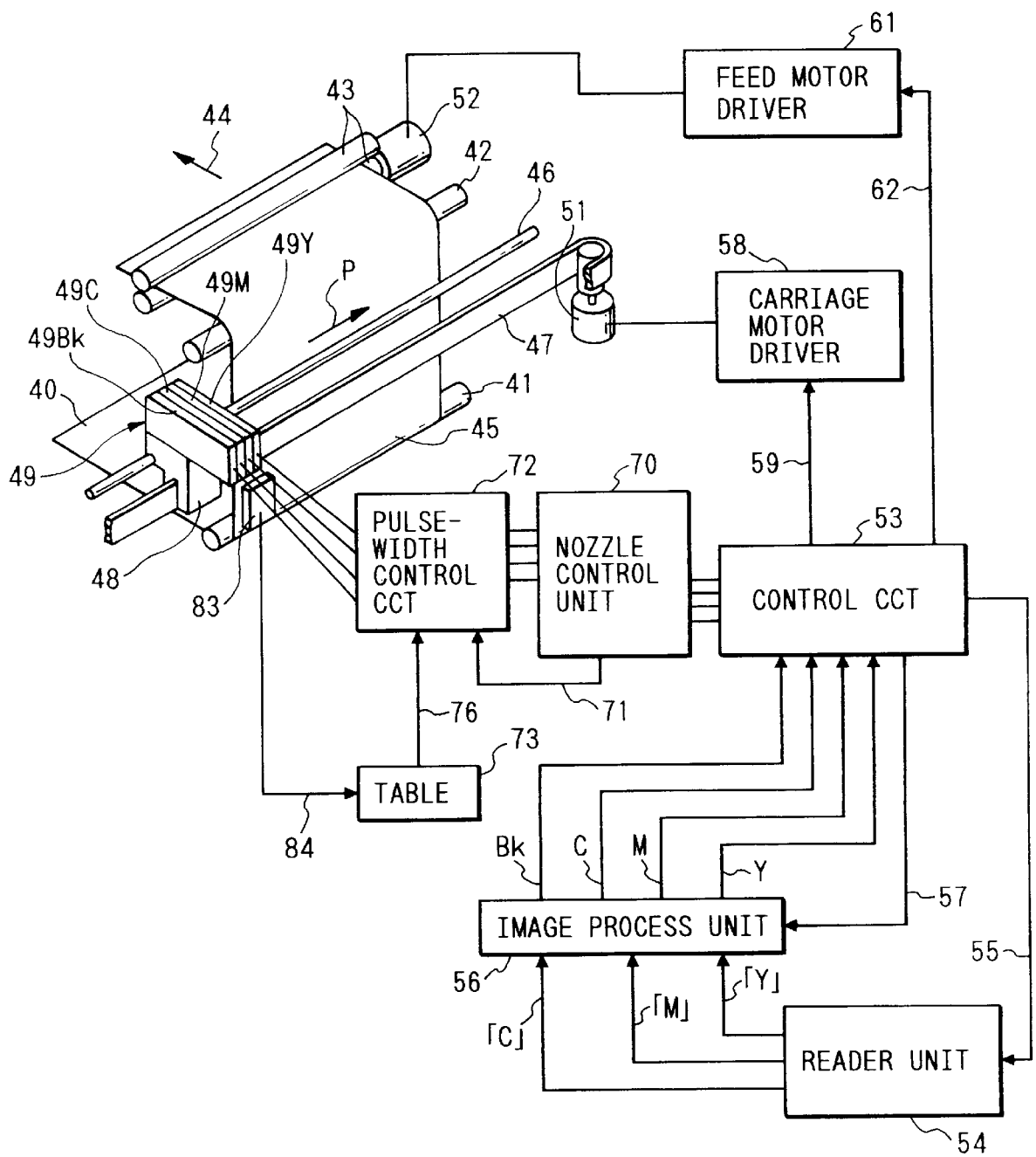
FIG. 22 shows a perspective view of a color ink jet recording apparatus and a control unit therefor in a tenth embodiment of the present invention.

FIG. 22 shows a perspective view of a color ink jet recording apparatus and a control unit therefor of the tenth embodiment of the present invention. In FIG. 22, the like elements to those of the eighth embodiment shown in FIG. 19 and the ninth embodiment shown in FIG. 21 are designated by the like numerals and the detailed explanation thereof is omitted. In FIG. 22, in addition to the configuration of FIG. 19, a table 73 similar to that of the seventh embodiment shown in FIG. 21 and a medium detection unit 83 for detecting a medium by using an optical characteristic or a manual medium detection unit (not shown) are provided. A type signal 84 representing a type of the medium is sent from the medium detection unit 83 or the manual medium detection unit (not shown) to the table 73, the table is selected in accordance with the signal, an image signal which suppresses the irregularity of density is selected, and the signal 76 is fed back to the pulse width control circuit 72 rather than to the image processing circuit 56 to control the drive pulse width for the recording head 49 for printing. The table 73 selects the pulse for suppressing the irregularity of density in accordance with the table selected by the type signal 84 of the recording medium from the medium detection unit 83 or the manual medium detection unit (not shown), and the selected signal 76 is sent to the pulse width control circuit 72 and the recording head 49 is driven in accordance with the selected pulse width for printing.

Figure 23:
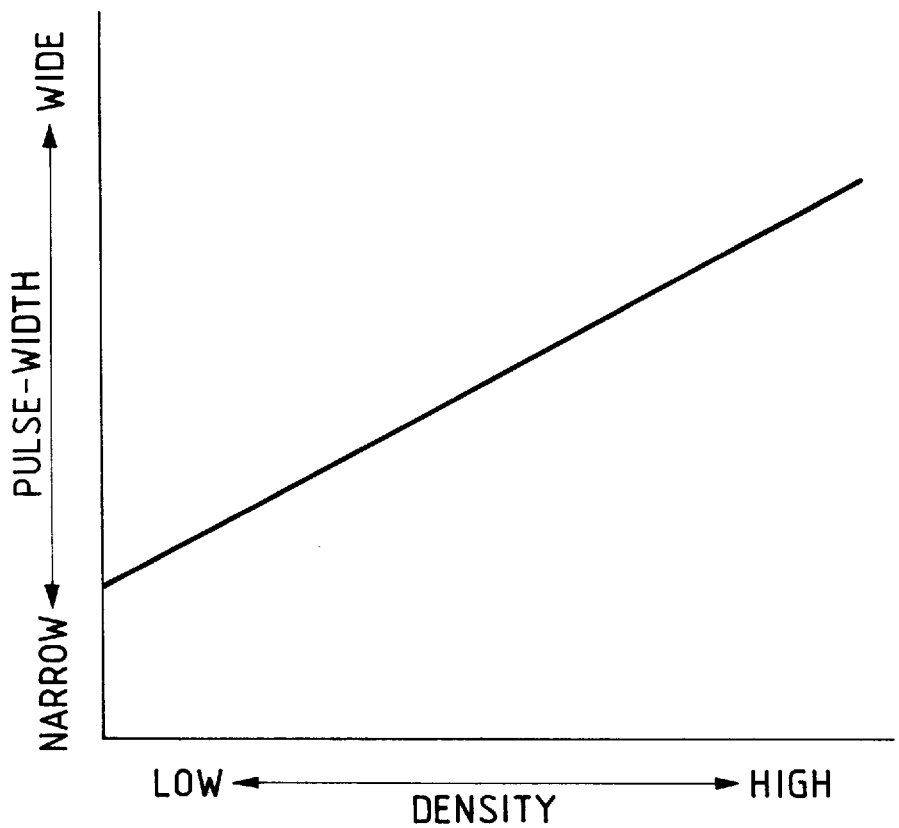
FIG. 23 shows a relation between a pulse width of a drive pulse applied to a recording head 49 and a print density.

FIG. 23 shows a relation between the pulse width of the drive pulse applied to the recording head 49 and the print density. In general, the pulse width and the density exhibit a relation as shown in FIG. 23, and the calculation is made in accordance with the relation, the pulse width is set to attain the density which fits to the selected medium, and the output signal is applied to the heater of the nozzle in the multi-scan area to suppress the irregularity of density.

Eleventh Embodiment

An embodiment in which a plurality of filter tables for thinning are manually selected in accordance with a density of image data or a document sheet to be copied is now explained. In the present embodiment, a basic configuration is similar to that of the first embodiment shown in FIG. 1 except the configuration of the nozzle selection unit 70 of FIG. 1.

Figure 24:
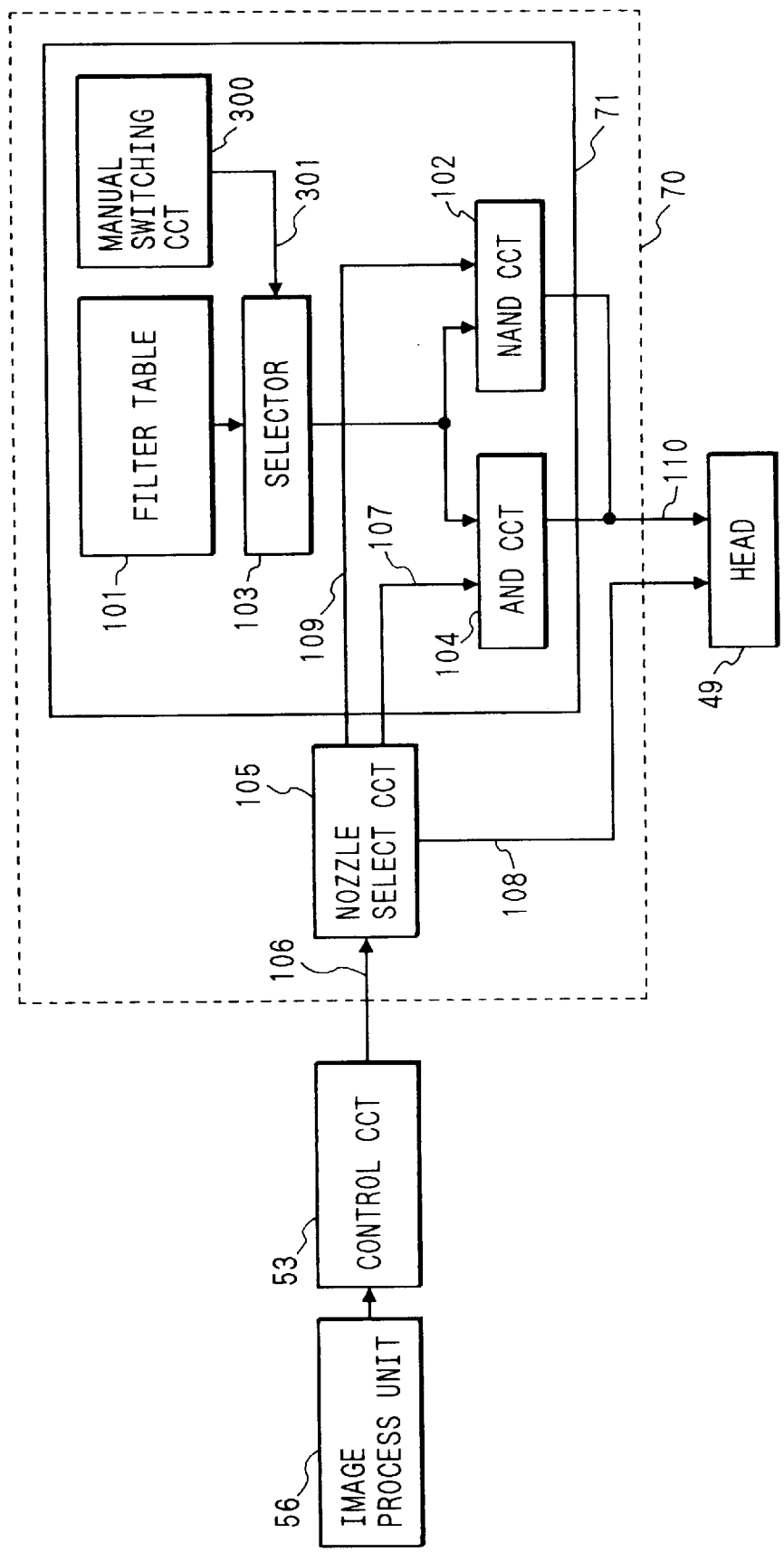
FIG. 24 shows a block diagram of a nozzle control circuit in an eleventh embodiment of the present invention.

FIG. 24 shows a block diagram of the nozzle control circuit 70 of the present embodiment.

The image signal 106 sent from the control circuit 53 is divided by the nozzle selection circuit 105 to image signals 107 and 109 for the nozzles which conduct the multi-scan and an image signal 108 for the nozzle which do not conduct the multi-scan. The image signal 106 for the nozzles which does not conduct the multi-scan is supplied to the head, the image signal 107 of the nozzles of the Z block which conduct the multi-scan is supplied to the AND circuit 104, and the image signal 109 for the nozzles of the X block which conduct the multi-scan is supplied to the NAND circuit 102. Numeral 71 denotes a pattern generation unit for generating the thinning and interpolation data of the image signal and has a plurality of filter tables 101 as will be described later. Numeral 300 denotes a manual switching circuit for generating a signal 301 to select the filter table. It generates the signal 301 for selecting the filter table in accordance with a manual input from a key.

FIG. 3 shows a model of the filter table 101. This table provides an effect of filter which arrange dots in a manner to prevent the occurrence of a black stripe. A pattern 81 shown in FIGS. 25A to 25C comprises a data pattern of '0', '0', '0' and '1' from the top to the bottom, and the data is sequentially read from the top and outputted to the circuit 102 and 104. The image signal synchronized with the clock signal is sequentially outputted to the AND circuit 102 and it is outputted as the image signal for the nozzles of the Z block through the AND circuit 104. Each time the head is moved by one pixel length in the scan direction, the data is sequentially read from the pattern 81, and when the data is '0', the image signal is not outputted from the AND circuit 104 and the nozzles in the Z block do not discharge the ink. On the other hand, when the data is '1', the image signal is outputted from the AND circuit 104 and the nozzles of the Z block discharge the ink to record the image. Accordingly, by using the pattern 81, the image formed by the nozzles of the Z block is thinned by the three pixels in the scan direction of the head and the recording is made at the fourth pixel, and it is repeated.

On the other hand, the signal read from the pattern 81 is applied to the NAND circuit together with the image signal 109 for the nozzles of the X block so that the image formed by the nozzles of the X block is recorded by three pixels in the scan direction of the head and the fourth pixel is eliminated. Namely, the dot eliminated by the nozzles of the Z block is interpolated.

By providing a plurality of such filters, more complex thinning of dots is attained so that an optimum thinning pattern to eliminate the black stripe on the recorded image is prepared.

When the record density changes by a difference of image data, a white stripe may appear on the recorded image or a black stripe may not be eliminated and the effect by the multi-scan may not be attained. For example, when image data having a high record density is inputted and the multi-scan is conducted by using the same filter table 101 as that used when the image data having a low density is inputted, the effect is not attained sufficiently.

Figure 25A:
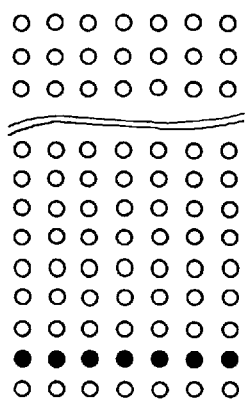
FIGS. 25A to 25C show patterns thinned in accordance with an image density.
Figure 25B:
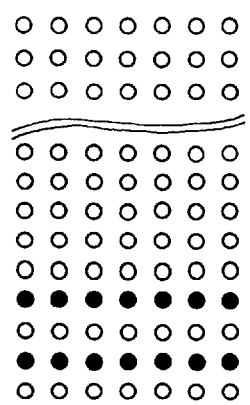
Figure 25C:
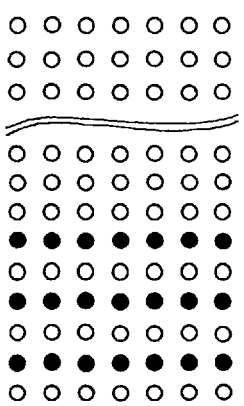

In the present embodiment, in order to manually switch the filter table 101 for conducting the thinning in accordance with the density of the image data or the document sheet to be copied, the selector circuit 103 switches the filter table 101 in accordance with the signal sent from the manual switching circuit 200 of FIG. 24. As a result, the high quality of image free from the stripe is attained. In this case, the filter table 101 which is switched in accordance with the density of the document sheet may be set such that the thinning area increases as the image density increases, as shown in FIGS. 25A to 25C. In FIGS. 25A to 25C, the dots are eliminated in the direction of arrangement (direction of nozzle column) as they are in a twelfth embodiment to be described later.

Twelfth Embodiment

In a twelfth embodiment, dots are thinned in the direction of nozzles of the head while in the eleventh embodiment described above, the dots are thinned in the direction of scan of the head.

In the present embodiment, the pattern 81 of FIG. 3 is used as the table of the filter table 101 as it is in the eleventh embodiment and the data of the pattern 81 is sequentially read from the top and it is applied to the circuits 104 and 102 of FIG. 24. When the image signals 107 of the nozzles Z-1, Z-2, Z-3 and Z-4 of the Z block are applied, the data '0', '0', '0' and '1' are read from the table 101. Accordingly, when the image signal of the Z-1 nozzle is sent from the nozzle selection circuit 105, the data '0' is sent from the filter table 101 to the AND circuit 104 so that the image signal of the Z-1 nozzle is '0' and the recording is not made by the Z-1 nozzle. The same is true for the Z-2, Z-3 and Z-4 nozzles. When the image signal of the Z-4 nozzle is sent from the nozzle selection circuit 105, the data '1' is sent from the filter table 101 to the AND circuit 104 and the Z-4 nozzle conducts the recording in accordance with the image signal. Because of the AND circuit 104, the first three pixels are eliminated in the direction of the column of the nozzles and the recording is made at the fourth pixel.

By providing a plurality of such filter tables 101, a more complex arrangement of dots is attained and an optimum thinning pattern for eliminating the black stripe on the recorded image can be prepared. For the nozzles of the X block to be interpolated, the filter table 101 used for thinning the image data for the nozzles of the Z block is used and the data read from the table 101 and the image signal 109 of the nozzles of the X block are applied to the NAND circuit 102 so that the interpolation signal is readily derived.

Thirteenth Embodiment

In a thirteenth embodiment, the filter table 101 is used and means for detecting the density from the image data is used to change the filter table 101 in accordance with the image data to attain the high quality of image.

Figure 26:
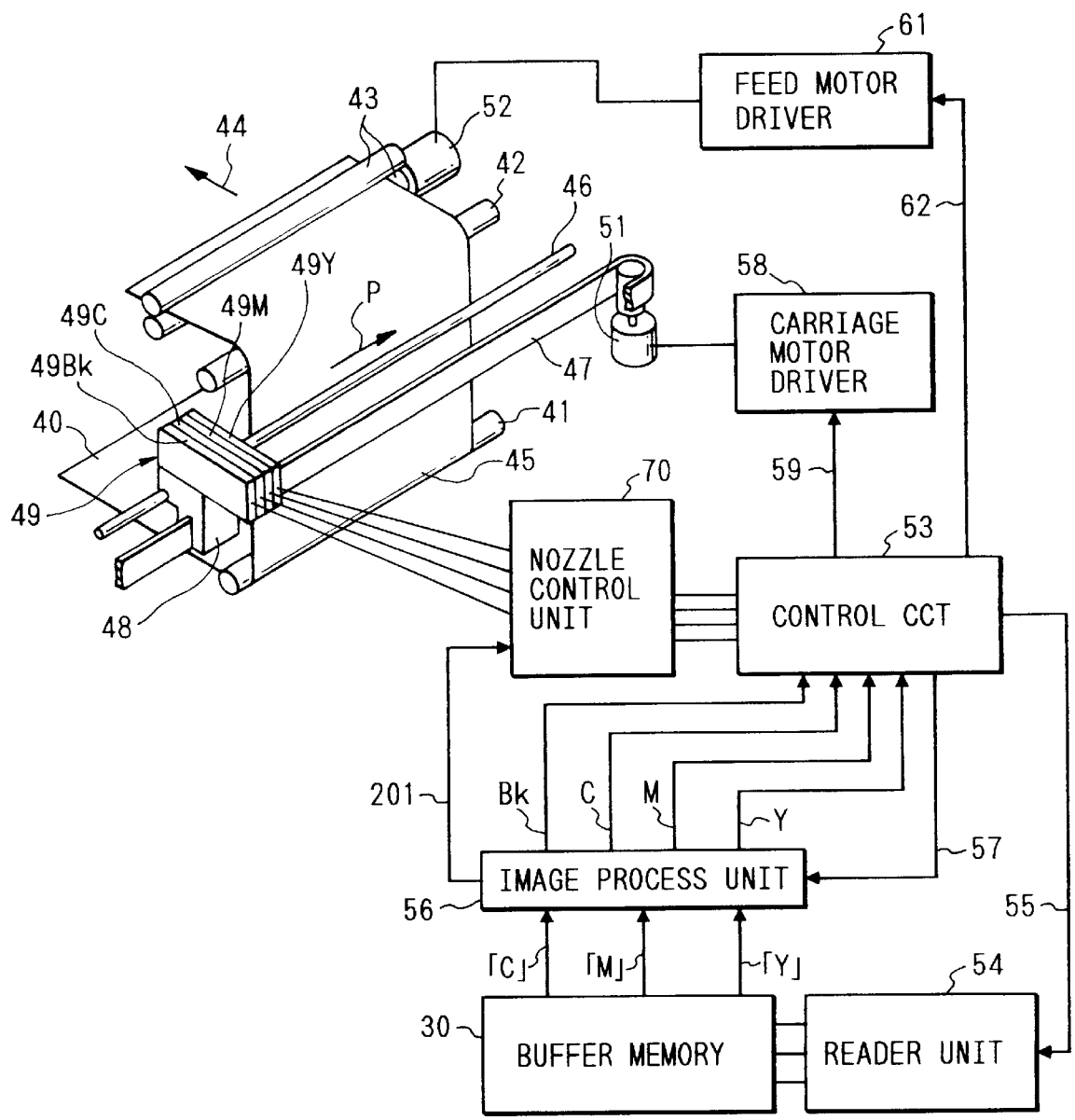
FIG. 26 shows major portions of a thirteenth embodiment of the present invention.

FIG. 26 shows a color ink jet recording apparatus and a control unit therefor of the thirteenth embodiment of the present invention.

In FIG. 26, one scan of image data sent from a host computer or the reader unit 54 is temporarily stored in a buffer memory 30. The record density is calculated by the image processing circuit 56 based on the image data for the nozzles in the vicinity of the end of the head and the signal 201 reflecting the calculation is sent to the nozzle control circuit 70 and the filter table 101 in the nozzle control circuit 70 is selected.

Figure 27:
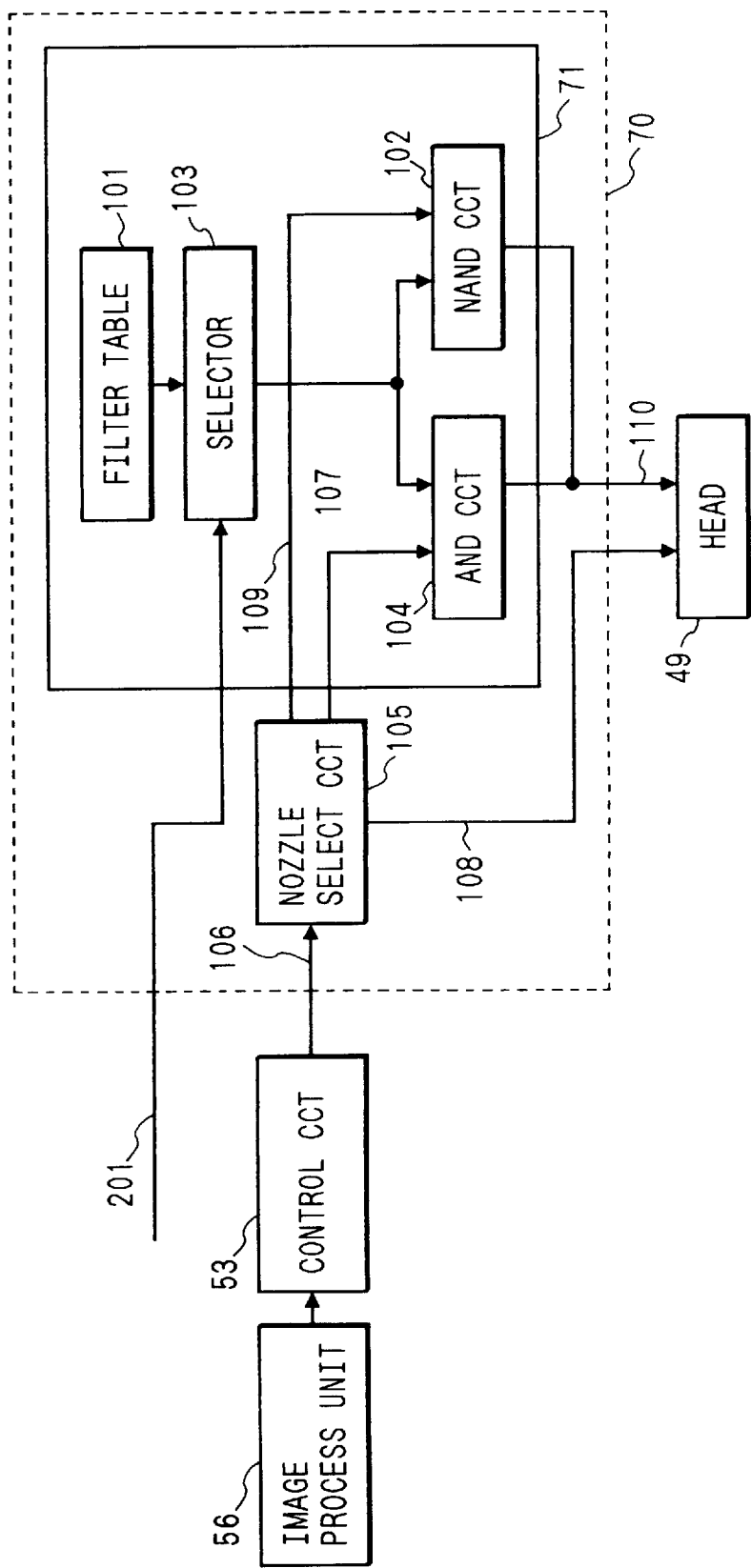
FIG. 27 shows a block diagram of a nozzle control circuit shown in FIG. 26.

FIG. 27 shows a block diagram of the nozzle control circuit of the present embodiment. The signal 201 sent from the image processing circuit 56 is sent to the selector 103 and the selector 103 selects the filter to be used from the filter table 101 and the signal from the selected filter is sent to the AND circuit 104 and the NAND circuit 102. In this manner, the high quality of image is attained by selecting the optimum filter on real time basis even if the density of the image data changes.

Fourteenth Embodiment

In a fourteenth embodiment, in addition to the multi-scan means in the thirteenth embodiment described above, the dots injected into the matrix are randomly eliminated to attain a high quality of image.

Figure 28:
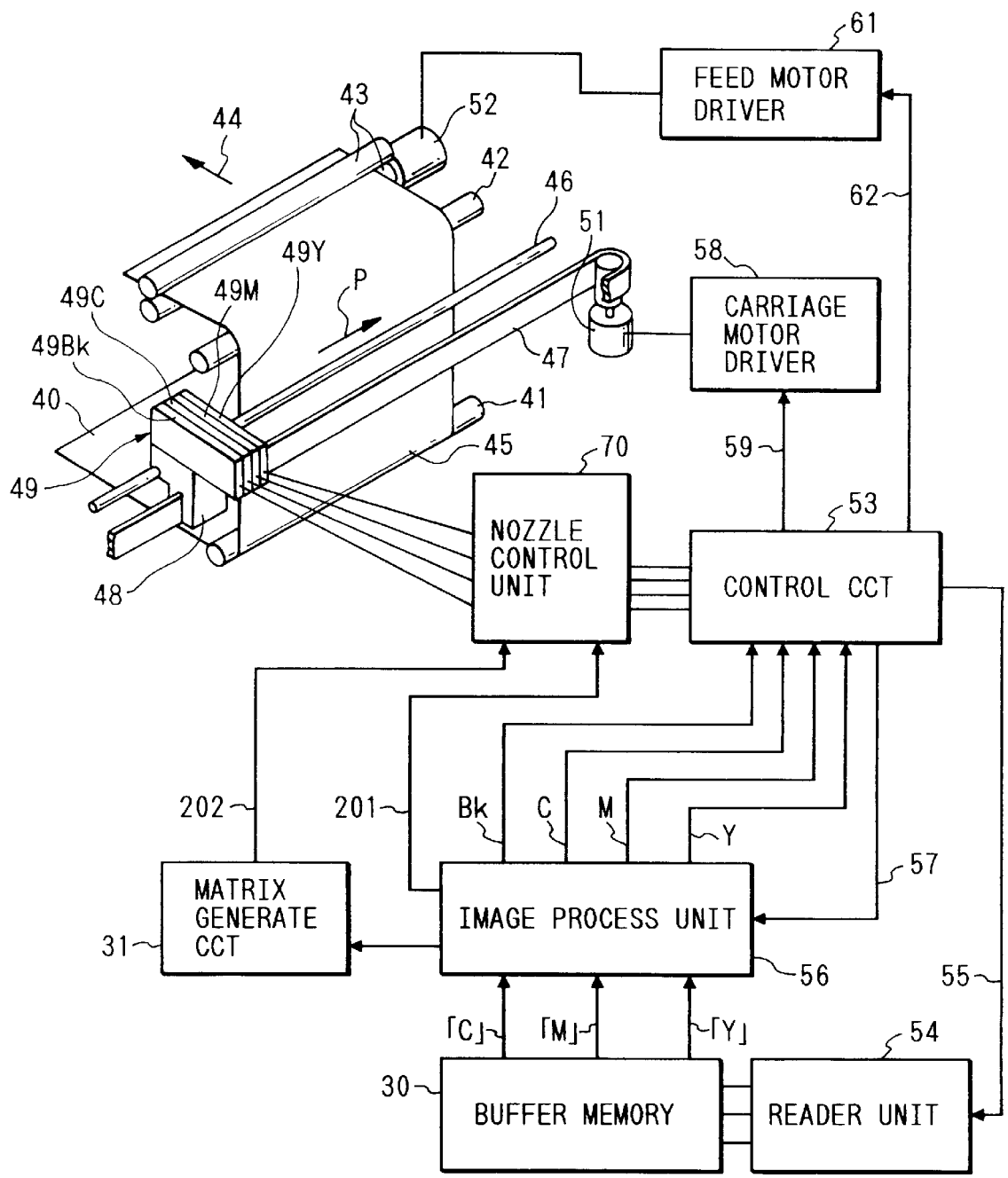
FIG. 28 shows major portions of a fourteenth embodiment of the present invention.

FIG. 28 shows a color ink jet recording apparatus and a control unit therefor of the present embodiment.

In FIG. 28, one scan of image data sent from the host computer or the reader unit 54 is temporarily stored in the buffer memory 30. The record density is calculated by the image processing circuit 56 based on the image data for the nozzles in the vicinity of the end of the recording head 49 and a matrix to be described later is assembled by a matrix generation circuit 31 based on the calculation result and the content thereof is outputted as a signal 202. The circuit 31 also generates a random number and sends it to the nozzle control circuit 70 together with the signal 202.

Figure 29:
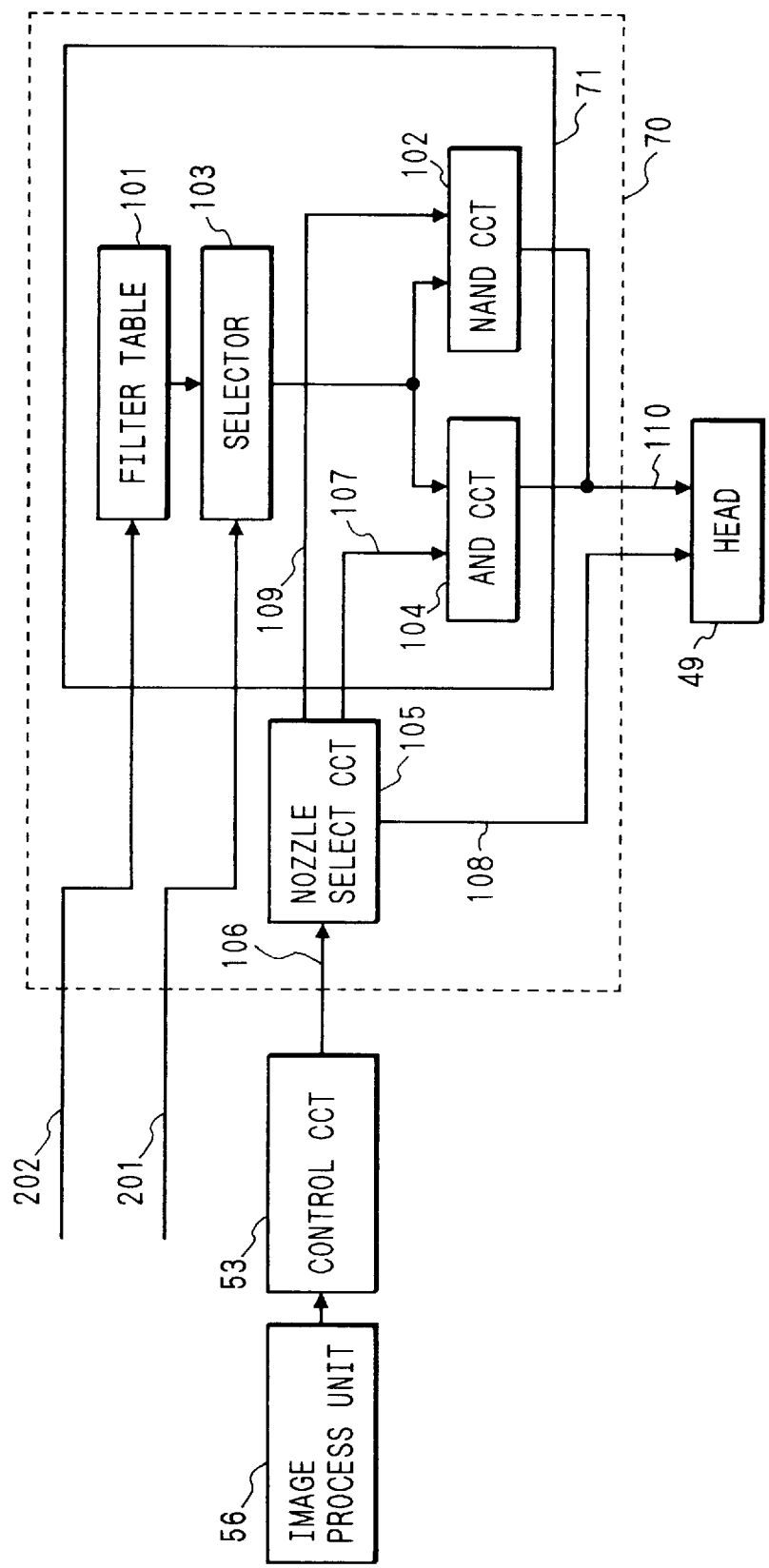
FIG. 29 shows a block diagram of a nozzle control circuit shown in FIG. 28, FIGS. 30A to 30C show patterns thinned in the fourteenth embodiment of the present invention.

FIG. 29 shows a block diagram of the nozzle control circuit 70. The signal 202 sent from the matrix generation circuit 31 is applied to the filter table 101 and the matrix for the signal 202 and the filter of the filter table 101 are combined in a manner to be described later and the combined content is outputted to the selector 103. The selector 103 switches the filter in accordance with the image density data by the signal 201 sent from the image processing circuit 56.

Figure 30A:
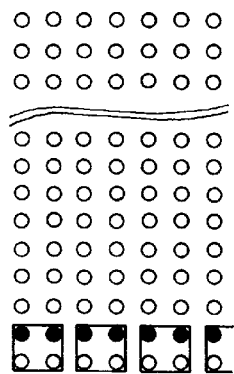
Figure 30B:
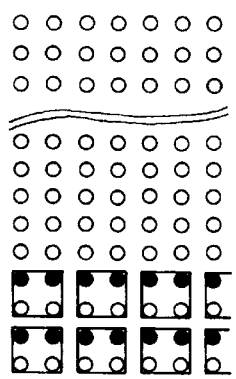
Figure 30C:
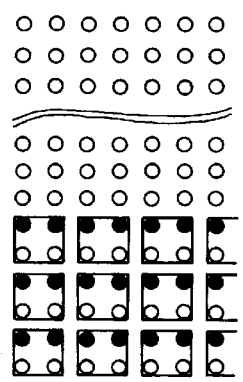

As for the matrix, in the method for thinning in the direction of the column of nozzles to multi-scan two nozzles at the end of the head as shown in FIG. 30A, a matrix of 2×2 (dots) is assembled. As shown in FIG. 30B, in the method of thinning in the direction of the column of nozzles to multi-scan for nozzles at the end of the head, two 2×2 (dots) matrices are arranged in the direction of the column of nozzles. As shown in FIG. 30C, in the method for thinning in the direction of the column of nozzles to multi-scan six nozzles at the end of the head, three 2×2 (dots) matrices are arranged in the direction of the column of nozzles. In this manner, the number of the 2×2 (dots) matrices is increased with the record density in the vicinity of the end of the head calculated based on the image data and the random thinning is made for the dots in the matrices to control the number of dots finally implanted.

In accordance with the present embodiment, the high quality of image is attained by the effect of the multi-scan even when the image data of a higher density than that of a normal image such as CG data is sent.

Fifteenth Embodiment

Referring to FIGS. 31 to 37, other embodiments of the present invention are explained.

Figure 31:
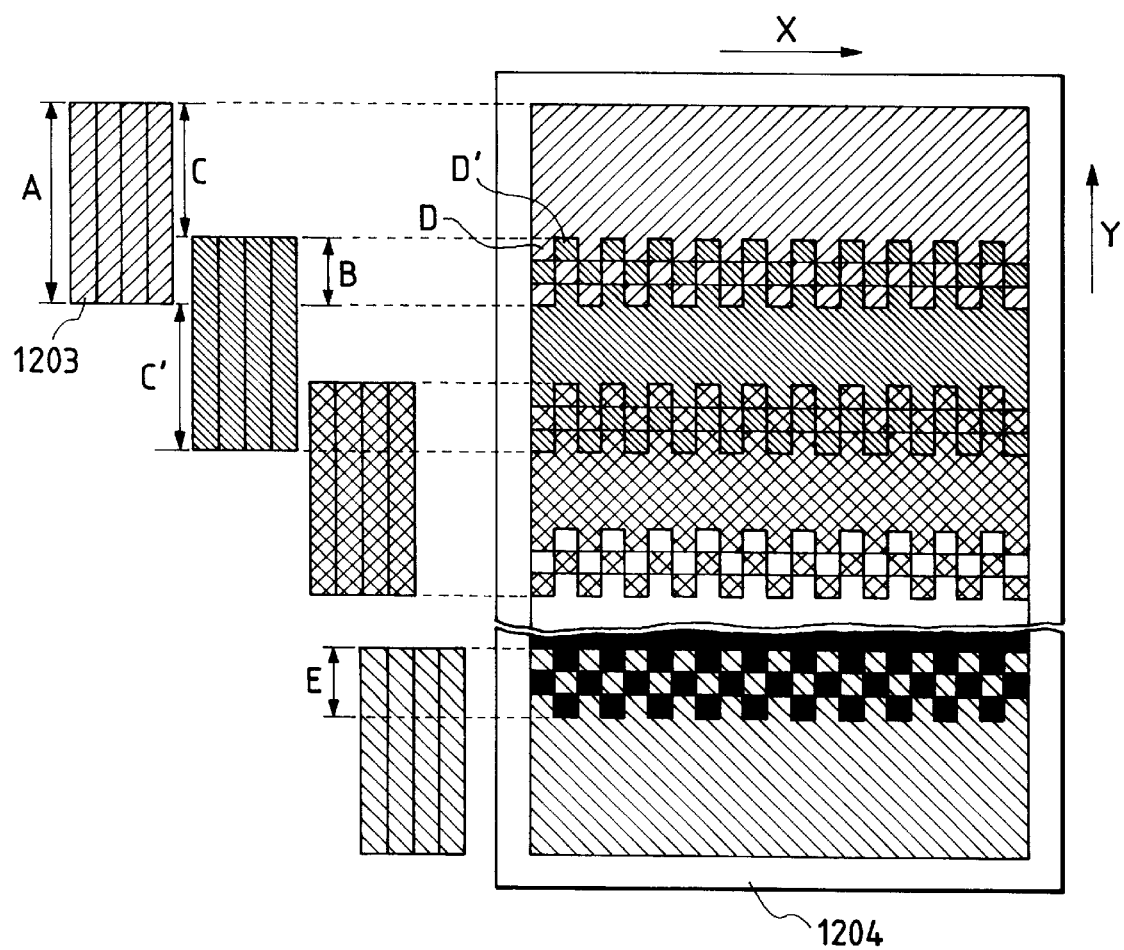
FIG. 31 illustrates a record operation in a copying apparatus in a fifteenth embodiment of the present invention.

FIG. 31 illustrates a recording operation in a copying apparatus to which the present invention is applied. In FIG. 31, a recording head 1203 is a color recording head and comprises four heads for yellow (Y), magenta (M), cyan (C) and black (Bk). A length of the recording head 1203 in the sub-scan direction is given by A which is equal to a record width A' recorded in one scan. Namely, in each head, 512 nozzles for discharging ink are arranged at a pitch of 400 dots/inch in the sub-scan direction so that a record of a 32 mm width can be made at a time. (Accordingly, the record width A'=32 mm).

The recording head 1203 repeats the discharge and the non-discharge of the ink in accordance with the image signal sent from the image processing unit while it is moved in the direction X. Accordingly, as the recording head moves, a band (an area A) is recorded on a recording sheet 1204.

In the present embodiment, each of a plurality of lines coated at an end of one band is recorded by a plurality of nozzles. (Hereinafter referred to as a multi-scan system.) Accordingly, a lower end of the first band (the area A in FIG. 31) is recorded with three lower nozzles along the sub-scan direction of the recording head 1203 being assembled in a set for every ninth pixel and each set repeating the discharge and the non-discharge of the ink and the pixels being arranged in a zig-zag pattern.

Namely, when the first band (the area A) is to be recorded, the recording is made based on the image signal for the nozzles in the area C (512–3=509 nozzles). Namely, all that are requested to record are recorded. However, for the low end three nozzles, a zig-zag pattern (area D) is formed as shown even if the record request is made.

Then, the recording head 1203 is returned to the original position and the recording sheet is fed by a distance equal to the record width A'=32 mm less the width corresponding to the three nozzles in the sub-scan direction (the direction Y). After the feed, the recording of a new band is started.

When the second band is recorded, since the feed distance is equal to the record width A'=32 mm less the width corresponding to the three nozzles (the distance corresponding to the width C), a portion thereof overlaps with the first band. This overlap area corresponds to the three nozzles at the upper end of the second band (area B). When this area is recorded, the zig-zag pattern as shown (area D') is formed and it is recorded in the non-recorded area in the first band. At the lower end of the second band (area D), three lower nozzles along the sub-scan direction of the recording head 1203 are assembled to a set for every ninth pixel as they are in the first band, and the discharge and the non-discharge of the ink are repeated for each set to make the zig-zag pattern recording. In the second band recorded in this manner, the first to third pixels arranged in the sub-scan direction from the zig-zag pattern and the fourth to 509th pixels form the area recorded by the normal image recording, and the 510th to 512nd pixels form the zig-zag pattern.

After the completion of the recording of the second pattern, the recording head is returned to the original position and the recording sheet is fed by the distance (the distance corresponding to the width C') equals to the record width A'=32 mm less the width corresponding to the three nozzles in the sub-scan direction (the direction Y) as it is for the first band.

When the third band and the subsequent bands are recorded, the same recording and the sheet feed as those for the second band are conducted.

When the last band is recorded, the zig-zag pattern recording is conducted only when the area corresponding to the upper three nozzles (the area D) is recorded and the area corresponding to the lower three nozzles is recorded with the normal record.

By recording the respective bands constituting the image, one image is formed.

The recording head uses the electro-thermal transducer element which causes film boiling in the ink as energy generation means for discharging the ink.

FIG. 32 shows a perspective view for illustrating a general configuration of a copying apparatus to which the present invention is applied.

In a copying apparatus 1200, a document sheet is mounted on a document sheet mount glass 1202 and it is illuminated by an illumination lamp (not shown) through bottom plane of the glass and a reflected light is sensed by a photo-electric conversion sensor 1201 to convert it to an electrical signal.

The photo-electric sensor 1201 has the same resolution as that of the recording head (400 dots/inch) and can read 512 pixels corresponding to the width of one band of the image at a time. (Accordingly, the read width is 512-pixel width.) The reading of the image is the repetition of reading one band along the main scan direction, moving the sensor 1201 by the distance equal to the read width in the sub-scan direction and resuming the reading.

The read image data is processed by the image processing unit to be described later and converted to the record signal and sent to the recording head 1203. The recording method of the recording head 1203 and the feed method of the recording sheet 1204 are similar to those for the previous embodiment. The recording sheet 1204 is fed by a sheet feed mechanism from a recording sheet cassette at the bottom of the copying apparatus 1200.

Figure 33B:
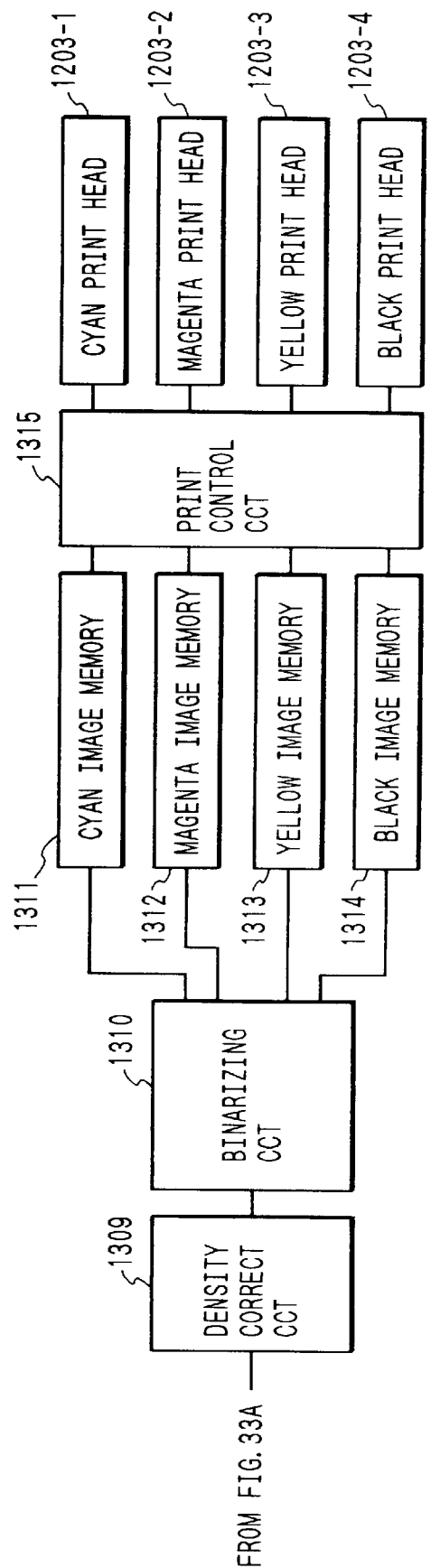

FIGS. 33A and 33B show block diagrams for explaining the configuration of the controller and the image processing unit of the copying apparatus of the present embodiment.

A photo-electric conversion sensor for full color (full color sensor) 1201 comprises a CCD (charge coupled device) sensor, and red, green and blue filters are attached to three such sensors to form the sensors for red, green and blue. Accordingly, they are constructed to produce three signals for red, green and blue colors, respectively, namely, three output signals represent one pixel.

The image signal is photo-electrically converted by the full color sensor 1201 and is converted to a digital signal by an A/D conversion circuit 1302. The digital image signal is sequentially sent to a shading correction circuit 1303 for correcting the irregularity of a sensitivity, a brilliance-density conversion circuit for converting the brilliance to the density, a black extraction circuit 1305 for generating a black signal from the color signal and a read area control circuit 1306 for controlling the read area of the document sheet.

In the present embodiment, a coordinate may be specified by an editor (not shown) and the document area may be recognized by detecting the document sheet. Thus, the read area control circuit 1306 may control the read area and the image signal may be transferred downward or stopped.

The area-controlled image signal is digitally magnified or reduced by a variable magnification circuit 1307 in accordance with a magnification factor specified by a console unit (not shown).

A head shading circuit 1308 records various density patterns generated by the image processing circuit on a recording sheet. The recording sheet is then mounted on the document sheet table and the density patterns recorded on the recording sheet are read by the sensor 1201. The node is converted such that an area of the read pattern having a low density is given a high density and an area having a high density is given a low density to correct the image data so that the record for a given density appears in a uniform density. When the multi-scan is conducted, the recorded pattern is read by using the multi-scan to prepare the correction data.

When the head shading is completed, the density compensation which complies with the characteristic of the printer is conducted by the density correction circuit 1309. The density-corrected image signal is binarized (based on an error diffusion method) by a binarization circuit 1310 and the results are stored in the image memories 1311 to 1312 of the respective colors. The recorded image signal is sequentially read in synchronism by the print control circuit 1315. In this case, the record pattern is controlled by the print control circuit 1315 and whether the recording is made in the zig-zag pattern shown in FIG. 31 or not is determined. The print control circuit 1315 drives the heads 1203-1 to 1203-4 for the respective colors based on the received image signal and controls the discharge and the non-discharge of the ink to record the image (the reproduced image of the read original image) on the recording sheet.

The control of the flow of the image signal and the control of the units of the copying apparatus are conducted by a microprocessor (CPU 1320) based on a control program stored in a memory (ROM 1327, RAM 1328) and the drive of a motor 1324, a sensor 1326 and other output means 1325 is controlled through input/output circuits 1321 and 1323.

The settings for operating the copying apparatus (selection of recording sheet, magnification, continuous copy and etc.) and the start of the copy operation may be manually set on a console panel of a console unit 1322 connected to the CPU 1320.

Figure 34:
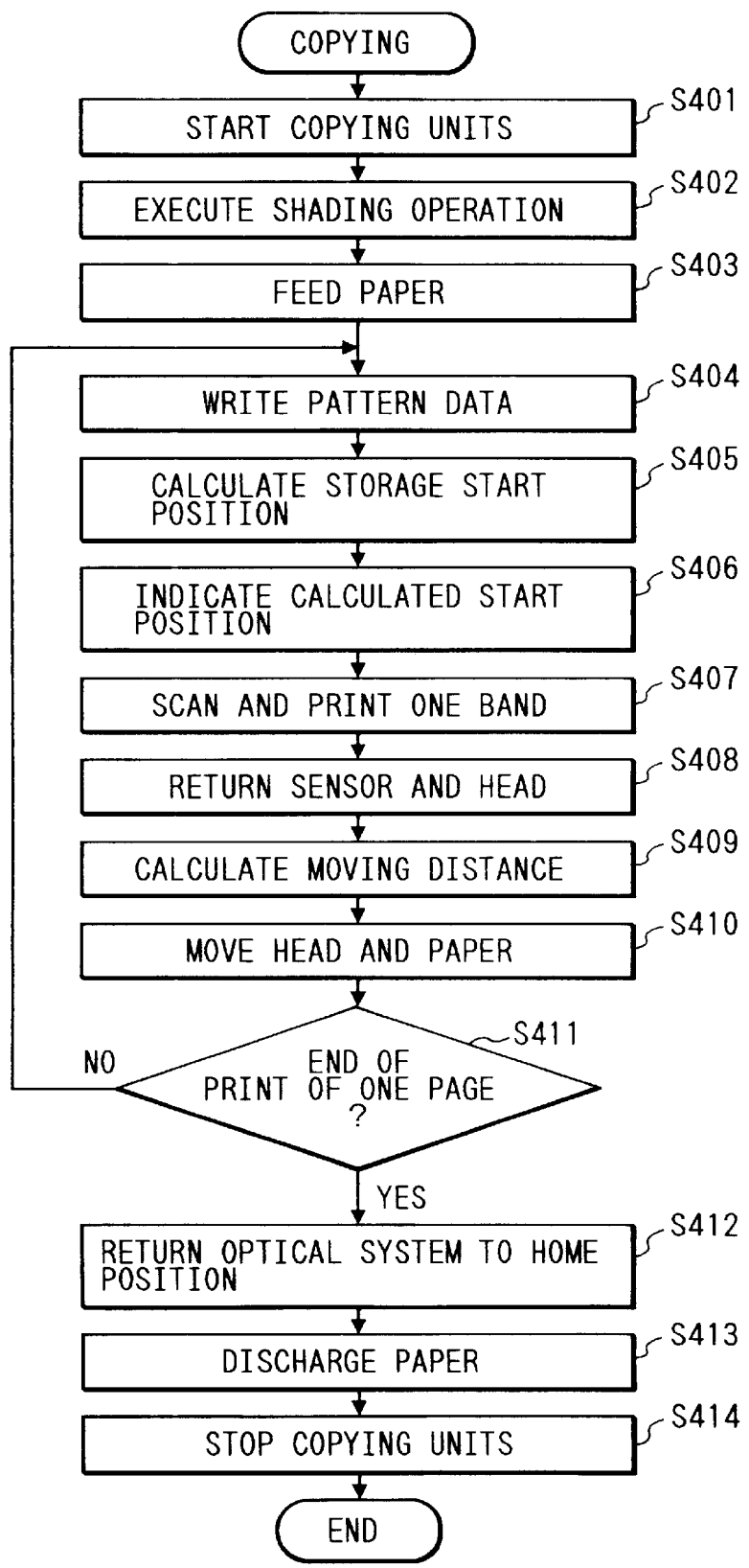
FIG. 34 shows a flow chart of a flow of a series of operations from the start of copy operation to the production of a reproduced image in the copying apparatus in the fifteenth embodiment of the present invention.

FIG. 34 shows a flow chart of a series of operations from the start of copy operation to the output of the reproduced image.

An operator sets a document sheet on the document sheet table and instructs the start of copy operation through the console panel. As a result, the operations of the respective units of the copying apparatus are started (S401), a lamp to illuminate the document sheet is turned on, a correction sheet is read and shading correction data for the sensor is read (S402). Then, the recording sheet is fed from the recording sheet cassette and it is fed to the recording unit (S403). By determining which band the data is to be recorded in, the record pattern data is written into the record control circuit 1315 (S404). The band determination is required because the nozzles to be used are different depending on whether it is the first band or the last band in the multi-scan. After the data has been written, the memory start positions of the memories 1311 to 1314 are calculated (S405). This is needed because in conducting the multi-scan to record a plurality of lines located at the end of the band by a plurality of nozzles, when the upper end portion (facing the first nozzle) of the band is to be recorded in the zig-zag pattern, the portion corresponding to the three lower nozzles of the image data read and recorded in the previous run is also to be recorded in the zig-zag pattern.

When the memory start positions of the memories 1311 to 1314 are calculated, the memory locations of the memories are indicated (S406). The reading of one band by the sensor and the recording by the recording head are started (S407).

In the present embodiment, the image signal read by the sensor and binarized is outputted in the following manner for the synchronous reading. First, several pixels of image are recorded in the memory and the reading is started while new pixels are written into the memory and read.

After the reading and the writing have been conducted, the sensor and the head are returned to the start position for reading and recording, respectively (S408).

Then, the distance equal to the record width less the width corresponding to the end (the multi-scan distance) in the sub-scan direction of the recording sheet is calculated as the recording sheet feed distance. Depending on the amount of read data recorded so far, the start position of the next reading is calculated (S409).

Based on the result of the calculation in the step S409, the feeding of the recording sheet and the movement of the recording head are conducted (S410).

Whether one recording sheet of printing has been completed or not is checked (S411). If it is NO (not completed), the process returns to the step S404 and the record pattern data is written. On the other hand, if it is YES (completed), the optical system including the sensor is returned to the home position and the recording sheet is ejected out of the apparatus (S412 to S413).

After the above step, the operations of the respective units of the copying apparatus are stopped and the process is terminated (S414).

In the present embodiment, the four colors, cyan, magenta, yellow and black are multi-scanned by the same record pattern using one recording control circuit although a plurality of recording control circuits, one for each color, may be provided and the multi-scan may be conducted with different record patterns.

Figure 35:
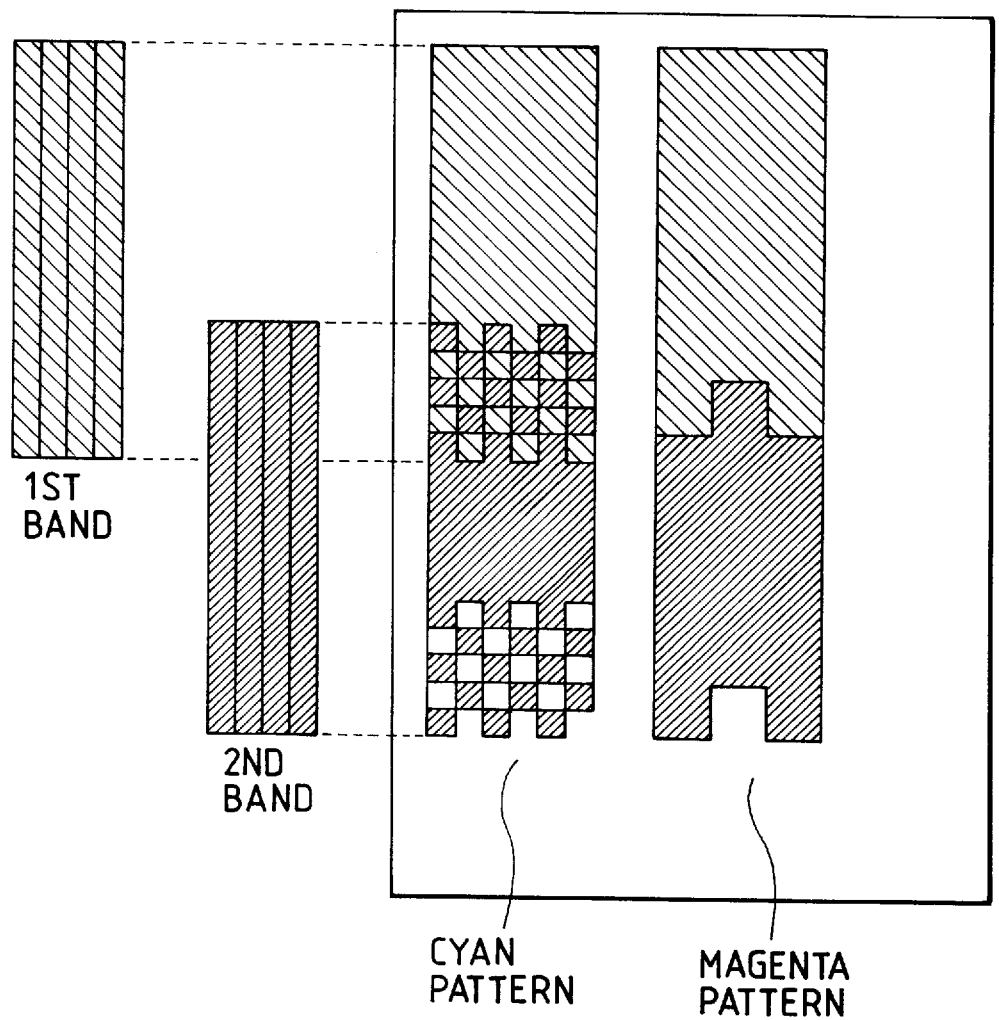
FIG. 35 shows an example for the multi-scanning by different record patterns in the copying apparatus in the fifteenth embodiment of the present invention.
Figure 36:
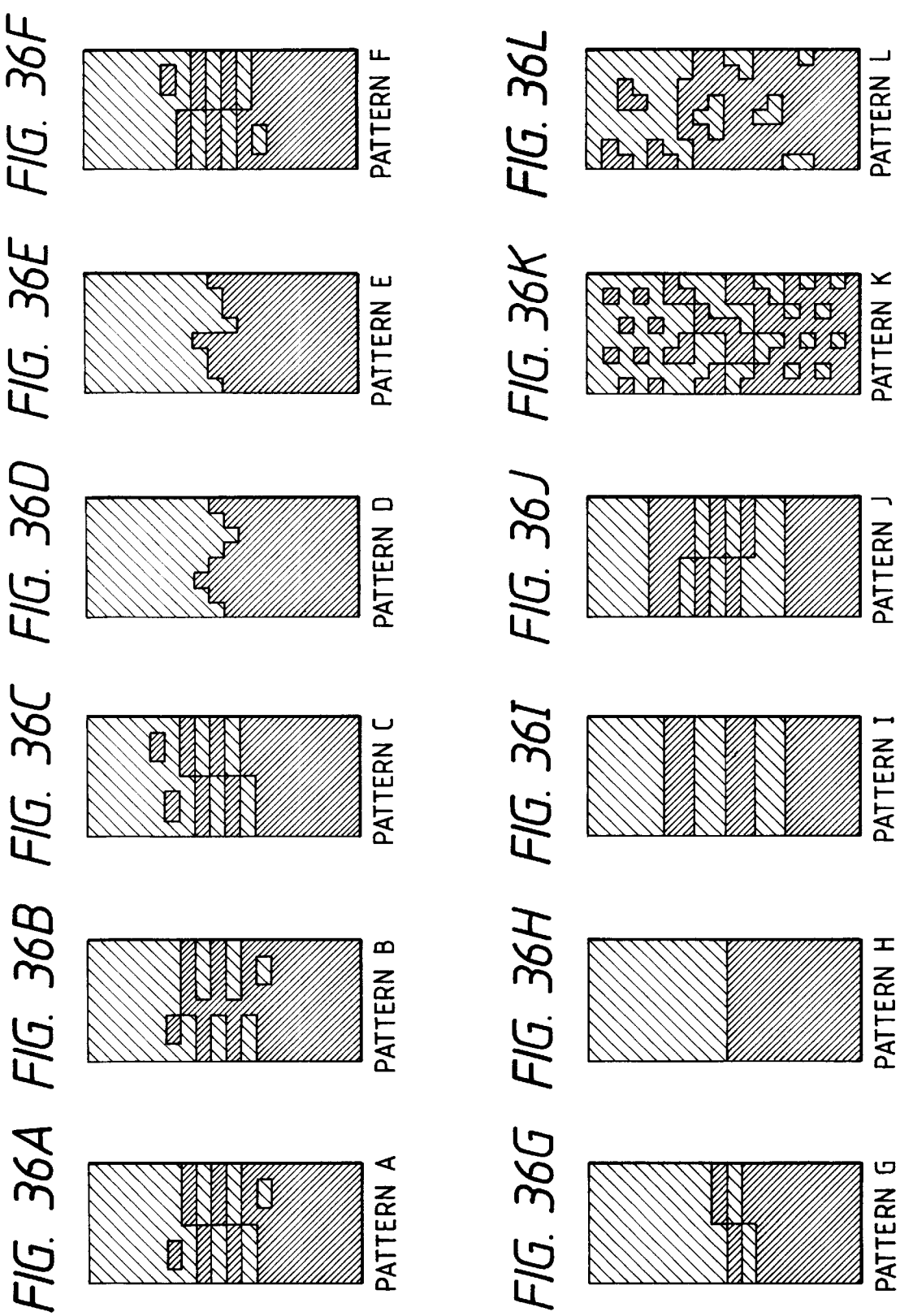
FIGS. 36A to 36L illustrate patterns of various multi-scanning.

FIG. 35 shows an example of the multi-scan with different record patterns. In FIG. 35, the cyan record pattern and the magenta record pattern are different from each other. Namely, the numbers of nozzles for the multi-scan are different and the grid intervals of the zig-zag pattern are different.

FIGS. 36A to 36L illustrate various multi-scan patterns. Rectangular pixels forming each pattern correspond to the nozzles, and the pixels represented by mesh correspond to the pattern recorded in the first scan and the pixels represented by hatching correspond to the pattern recorded in the second scan. The sizes and the number of times of repetition are not limited to those shown in FIG. 35 or FIGS. 36A to 36L.

In FIGS. 36A to 36L, each pattern is recorded in the following manner.

In a pattern A, pixels are recorded alternately in a short dot line pattern.

In a pattern B, pixels are recorded with slight overlap of dots of the dotted line of the pattern A to make the separation of dots unclear.

In a pattern C, a boundary of a portion in which the entire area is recorded at a time without the multi-scan and a portion in which the multi-scan is conducted is recorded in a discrete pattern.

In a pattern D, the multi-scan is conducted in a triangle shape.

In a pattern E, it is conducted in a sawtooth shape.

In a pattern F, the manner of recording of the multi-scan portion of the pattern A is reversed.

In a pattern G, the multi-scan portion of the pattern F is reduced.

In a pattern H, the multi-scan pattern is not conducted.

In a pattern I, recording is made at every other line. Of course, it is not limited to the every other line.

In a pattern J, the pattern I is modified.

In a pattern K, the amount of printing in the boundary area is gradually reduced or increased.

In a pattern L, the boundary area is blanked in wedge shape.

The record patterns A to L may be changed for each color to be recorded. For example, the pattern A may be used for cyan and the pattern F may be used for magenta.

Further, the number of lines for the multi-scan may be changed for each color to be recorded. For example, the cyan recording may use the pattern C with the 9-line multi-scan, the yellow recording may use the pattern H without the multi-scan and the black recording may use the pattern G with the 3-line multi-scan. In this case, the pattern may not be changed but only the number of lines for the multi-scan may be changed. Of course, the number of lines is not limited to the specific number.

The pattern for the multi-scan may be changed with the amount of record. For example, when the amount of record is large, the pattern A may be used and when the amount of record is small, the pattern G or H may be used. In the latter case, the recording speed is higher than that of the former case.

The record pattern may be selected by taking the property of the ink into account. For example, when the ink which is readily affected by other inks is used, the record pattern of other color may be used depending on the count of the ink.

Further, whether the multi-scan is to be conducted or not may be determined by a ratio of the count to the total number of pixels. For example, when the count is lower than a predetermined count, the multi-scan may not be conducted.

Further, a switch for selecting the multi-scan may be provided on the console unit. For example, for a document sheet having many fine patterns and non-prominent irregularity, the multi-scan is not conducted. For a document sheet having many uniform images, the multi-scan may be conducted.

In the present embodiment, the area to be multi-scanned is recorded in two scans although it is not restrictive and three or more scans may be used. Further, the area to be multi-scanned may be divided into the 2-scan area and the 3-scan area.

Figure 37:
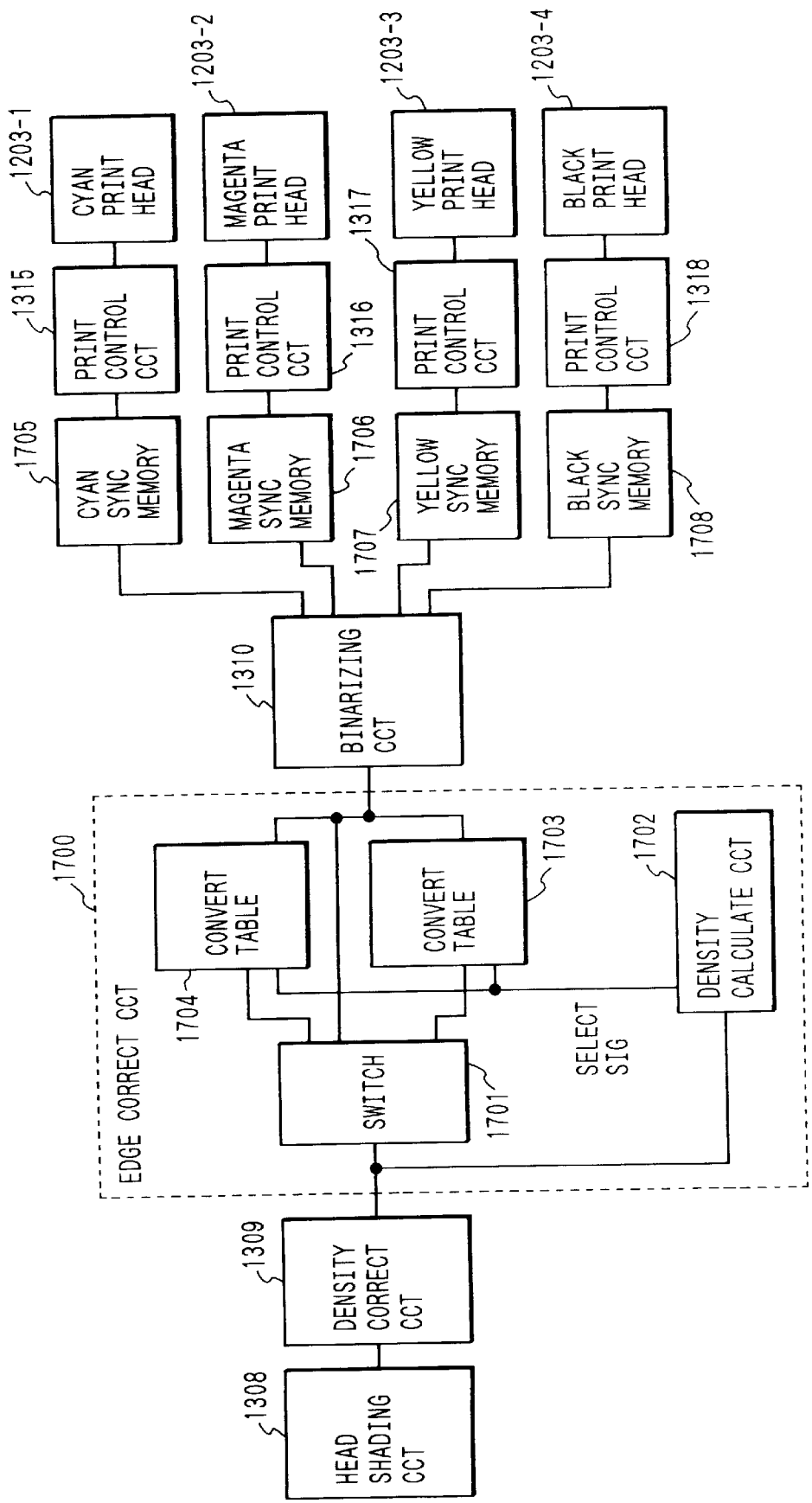
FIG. 37 shows a configuration of an image processing unit having an edge correction circuit built therein in the copying apparatus in the fifteenth embodiment of the present invention.
Figure 38:
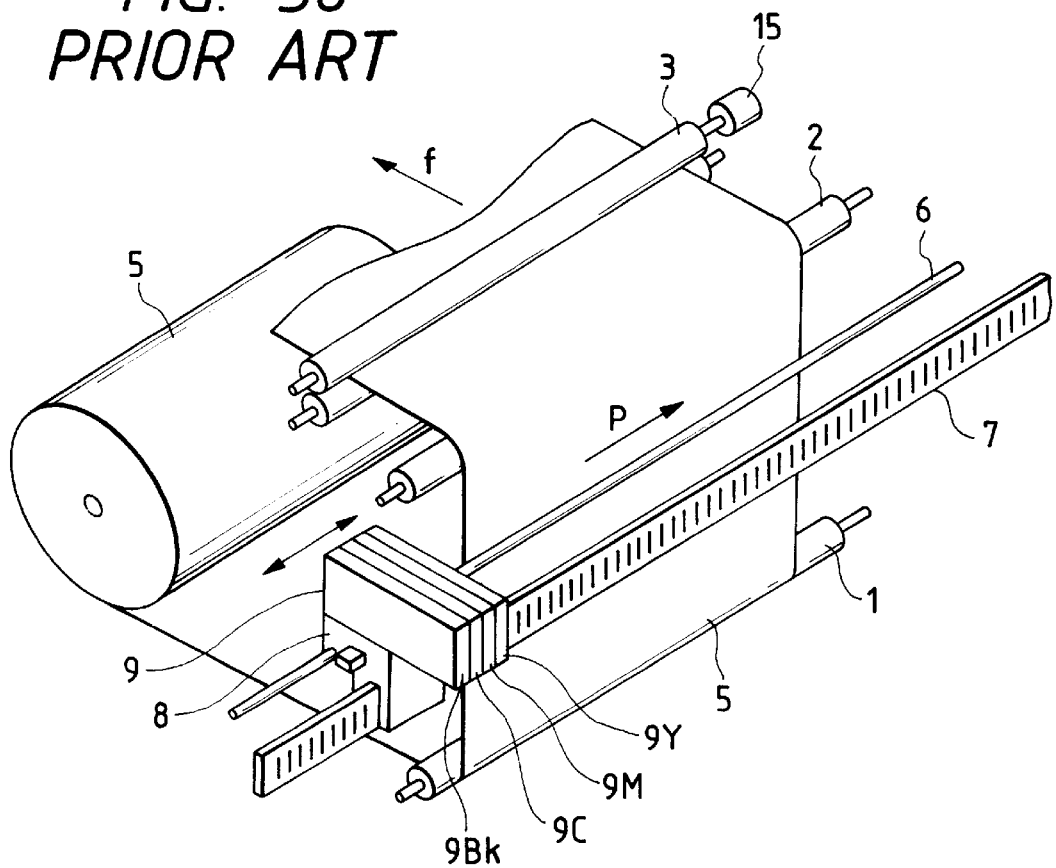
FIG. 38 shows a perspective view if a prior art ink jet recording apparatus.
Figure 39A:
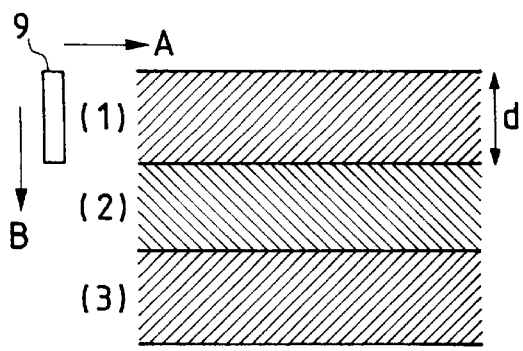
FIGS. 39A and 39B illustrate recording states of a joint for each recording scan of a recording head in the prior art.
Figure 39B:
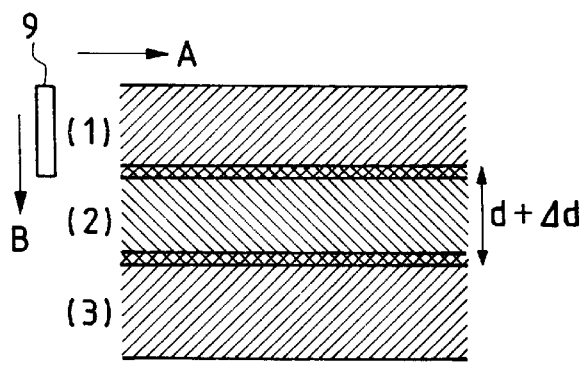
Figure 40:
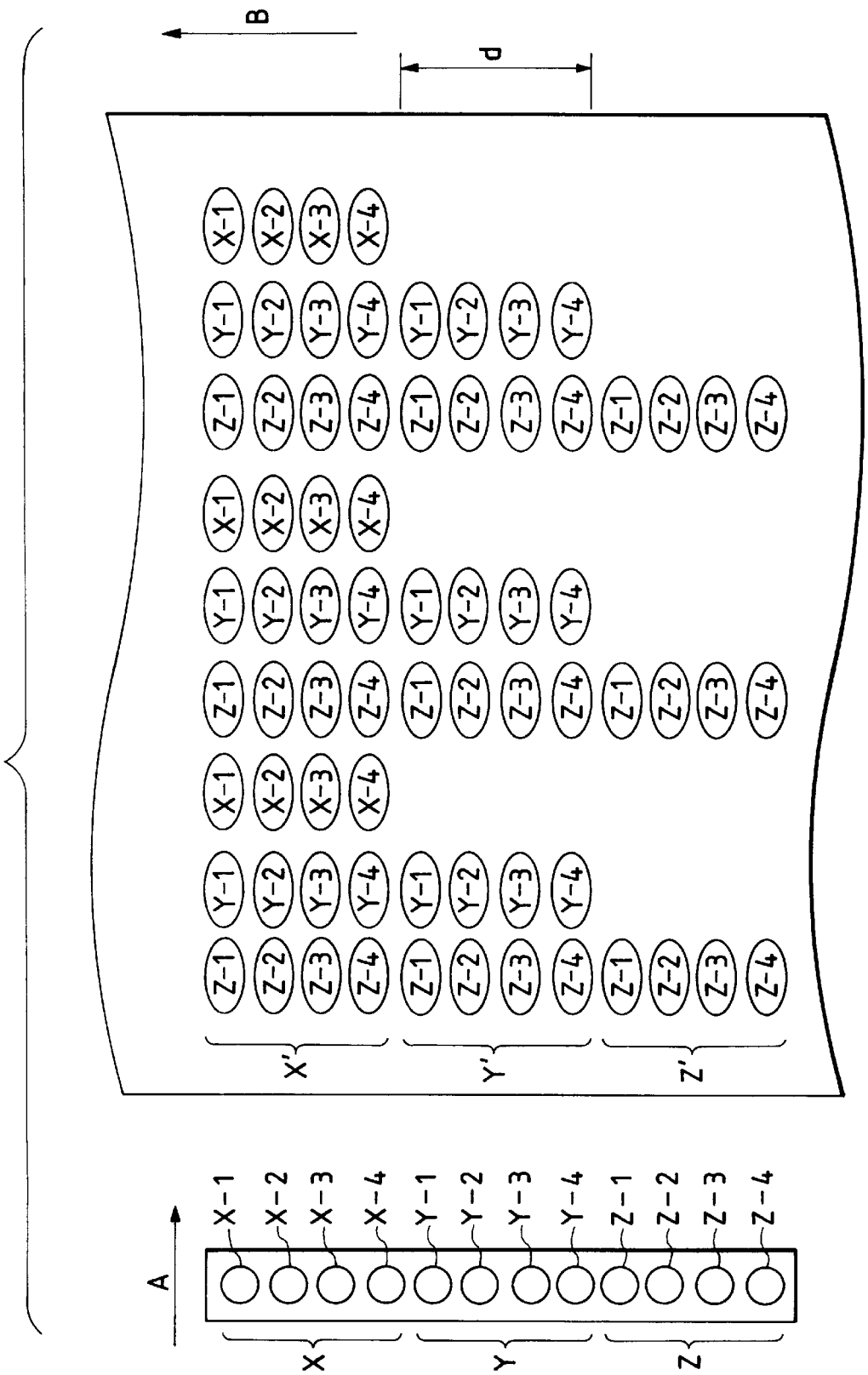
FIG. 40 shows a printing method representing a characteristic of a prior art multi-scanning system.

In the band printing, the ink is concentrated in the boundary of bands and the boundary of bands appears dark. In order to correct it, an end correction method for making the density gradually lighter or darker toward the boundary of bands has been proposed. By combining this method with the multi-scan, it is possible to make the irregularity less prominent. (A circuit configuration therefor is shown in FIG. 37.) FIG. 37 shows a diagram of a configuration of an image processing unit having an end correction circuit built therein.

The image data having been processed by the head shading circuit 1308 and the density correction circuit 1309 is applied to the end correction circuit 1700. In this circuit, since the amount of correction is varied with the density of the image, the density of the image is matrix-calculated by the density calculation circuit 1702. Based on the calculation result, the table circuits 1703 and 1704 which includes a plurality of conversion tables are selected. The conversion of the density of the image is conducted by the selected tables.

The switch 1701 determines whether the recording is toward the boundary of bands or away from the boundary depending on the location of nozzle by which the image signal is recorded. Based on the decision, the table is switched. Namely, whether the table 1703 having the gradually descending density gradient is to be used or the table 1704 having the reverse density gradient is to be used is determined. For the image signal corresponding to zero nozzle at the boundary, it is not passed to the conversion table. In this case, the density correction is made for ten nozzles at the boundary of bands. The image signal from the end correction circuit is binarized by the binarization circuit 1310 and temporarily stored in the synchronization memories 1705 to 1708 for the respective colors. The synchronization memories correct the head distance and synchronize the signal. This memory is of smaller capacity than that shown in FIGS. 33A and 33B because in FIGS. 33A and 33B, the image signal not recorded by the record control circuit is read from the memory and recorded in the next band recording and hence one extra band needs to be stored while in FIG. 37, the multi-scan is conducted at the end and the record of the first band and the record of the second band use different correction tables, and hence the multi-scan area need be read again and passed through the correction table. Thus, it is not necessary to store one band and the memory capacity need not be increased. However, it is necessary to change the control such as the movement of the sensor so that the multi-scan area is read again by the image read control.

The start location of the nozzle for the end correction may be selected and the correction table may be changed depending on the multi-scan pattern. It may be changed in pair with the multi-scan pattern depending on the type of the recording sheet.

Further, depending on the type of the recording sheet, the use of only the end correction, the use of only the multi-scan and the use of both the end correction and the multi-scan may be selected. In this case, whether the multi-scan is conducted simultaneously or not, the switch for selecting the start location of nozzle for the end correction and the correction table may be changed.

What is claimed is:

1. A recording apparatus comprising:
   recording means having a nozzle line comprising a plurality of nozzles arranged along a sub-scan direction for recording a band having a record width corresponding to a length of the nozzle line onto a recording medium in accordance with an input image signal by discharging ink from said nozzles along a main scan direction orthogonal to the sub-scan direction;
   transport means for intermittently transporting the recording medium in the sub-scan direction; and
   control means for controlling the drive of said recording means and said transport means;
   said control means setting a transport distance of the recording medium by said transport means to a distance smaller than the record width when the image to be recorded on the recording medium comprises a plurality of bands;
   each of the bands having at least one end having an image pattern complement to an image pattern at an end of adjacent band along the sub-scan direction; and
   the length of the end in the sub-scan direction being equal to a difference between the record width and the transport distance,
   wherein said control means determines at least one of the width of the boundary area, the pixel pattern to be recorded in one scan and the density of the boundary area based on the input image signal or the count of the image input signal.

2. A recording apparatus according to claim 1, wherein said recording means is for color recording and has recording heads one for each of a plurality of colors, and said control means determines at least one of the width of the boundary area, the pixel patterns to be recorded in one scan and the density of the boundary area based on the color of the band to be recorded.

3. A recording apparatus according to claim 2, wherein said control means determines at least one of the width of the boundary area, the pixel patterns to be recorded in one scan and the density of the boundary area based on the type of the recording medium.

4. A recording apparatus according to claim 3, wherein the density of the boundary area has a density gradient in a predetermined direction from the end of the boundary area of bands.

5. A recording apparatus according to claim 4, wherein said recording means uses an electro-thermal transducer element for causing film boiling in the ink as energy generation means to discharge the ink.

6. An information processing system having a recording apparatus according to claim 1 as output means.

7. An information processing system according to claim 6 wherein said information processing apparatus is a copying apparatus comprising:
   read means for reading a document sheet; and
   image processing means for processing the image data read by said image read means.

8. A recording method applied to a recording apparatus comprising recording means having a nozzle line comprising a plurality of nozzles arranged along a sub-scan direction for recording a band having a record width corresponding to a length of the nozzle line onto a recording medium in accordance with an input image signal by discharging ink from said nozzles along a main scan direction orthogonal to the sub-scan direction, transport means for intermittently transporting the recording medium in the sub-scan direction, and control means for controlling the drive of said recording means and said transport means, said method comprising the steps of:
   setting a transport distance of the recording medium by said transport means to a distance smaller than the record width when the image to be recorded on the recording medium comprises a plurality of bands;
   rendering each of the bands to have at least one end having an image pattern complement to an image pattern at an end of an adjacent band along the sub-scan direction;
   making the length of the end in the sub-scan direction to be equal to a difference between the record width and the transport distance; and
   determining at least one of the width of the boundary area, the pixel pattern to be recorded in one scan and the density of the boundary area based on the input image signal or the count of the image input signal.

9. A recording method according to claim 8, wherein said recording means is for color recording and has recording heads one for each of a plurality of colors, and said method further comprising the step of:
   determining at least one of the width of the boundary area, the pixel patterns to be recorded in one scan and the density of the boundary area based on the color of the band to be recorded.

10. A recording method according to claim 9, further comprising the step of:
    determining at least one of the width of the boundary area, the pixel patterns to be recorded in one scan and the density of the boundary area based on the type of the recording medium.

11. A recording method according to claim 10, wherein the density of the boundary area has a density gradient in a predetermined direction from the end of the boundary area of bands.

12. A recording method according to claim 11, wherein said recording means uses an electro-thermal transducer element for causing film boiling in the ink as energy generation means to discharge the ink.

13. An ink jet recording apparatus having a recording head movable in a main scan direction for discharging ink from a plurality of nozzles and drive means for relatively moving said recording head and a recording medium in a sub-scan direction, comprising;

control means for controlling said recording head and said drive means such that a record portion on one side along a sub-scan direction of a record area of an image recorded in one scan of the recording head overlaps a record portion on the other side along the sub-scan direction and center areas along the sub-scan direction do not overlap; and thinning and interpolation means for thinning record pixels on one side along the sub-scan direction for the image recorded in one scan of the recording head and interpolating record pixels on the other side along the sub-scan direction in accordance with the thinning.

14. An ink jet recording apparatus according to claim 13 further comprising:

selection means for selecting thinning and interpolation patterns of the record pixels.

15. An ink jet recording apparatus according to claim 14 wherein said selection means selects the pattern in accordance with the density of the image derived from the image data.

16. An ink jet recording apparatus according to claim 14 wherein said selection means changes the pattern by a random number.

17. An ink jet recording apparatus according to any one of claims 13 through 16 wherein said recording head has an electro-thermal transducer element for generating thermal energy to cause film boiling in the ink as an energy to be used to discharge the ink.

18. A recording apparatus for forming an image on a recording medium by a set of dots by discharging ink of at least one color from at least one recording head, comprising:

image forming means for forming the image on the recording medium by scanning the recording head a plurality of times;

said image forming means forming the image at the end of each scan of the recording head in a plurality of runs, wherein said image forming means conducts the thinning and the interpolation of a boundary area of adjacent images when the image is formed in the plurality of runs, and wherein said image forming means allows the selection of the processing patterns for the thinning and the interpolation when the image is formed in the plurality of runs.

19. A recording apparatus according to claim 18 wherein said image forming means selects the patterns for the thinning and the interpolation in synchronism with an external synchronization signal when the image is formed in the plurality of runs.

20. A recording apparatus according to claim 18 wherein said image forming means synchronously selects the patterns for the thinning and the interpolation when the image is formed in the plurality of runs.

21. A recording apparatus according to any one of claims 18 through 20 wherein said image forming means varies a position of the nozzle at the boundary of scans when the image is formed in the plurality of runs.

22. A recording apparatus according to any one of claims 18 through 20, wherein said image forming means selects the processing pattern in accordance with a degree of spread of the image.

23. A recording apparatus according to any one of claims 18 through 20, wherein said image forming means allows the generation of the processing pattern.

24. A recording apparatus according to claim 18 wherein said image forming means conducts the thinning and the interpolation of pixels at the end of a boundary area of an image adjacent to the image formed in a plurality of runs.

25. A recording apparatus according to any one of claims 18 through 20, further comprising:

selection means for selecting an image signal to be controlled in accordance with the recording medium.

26. A recording apparatus according to claim 25 further comprising:

control means for controlling a pulse width of a drive pulse of the recording head on accordance with the recording medium to control the amount of discharge of the ink from the recording head.

27. A recording method by a recording apparatus for forming an image on a recording medium by a set of dots by discharging ink of at least one color from at least one recording head, comprising the step of:

forming the image at an end of each scan of the recording head in a plurality of runs when the image is formed on the recording medium by scanning the recording head a plurality of times, wherein the thinning and the interpolation of a boundary area of adjacent images are conducted when the image is formed in the plurality of runs, and wherein the processing patterns for the thinning and the interpolation are selectable when the image is formed in the plurality of runs.

28. A recording method according to claim 27 wherein the patterns for the thinning and the interpolation are selected in synchronism with an external synchronization signal when the image is formed in the plurality of runs.

29. A recording method according to claim 27 wherein the patterns for the thinning and the interpolation are synchronously selected when the image is formed in the plurality of runs.

30. A recording method according to any one of claims 27 through 29 wherein a position of the nozzle at the boundary of scans is varied when the image is formed in the plurality of runs.

31. A recording apparatus according to any one of claims 35 through 29, wherein the processing pattern is selected in accordance with a degree of spread of the image.

32. A recording method according to any one of claims 27 through 29, wherein the generation of the processing pattern is allowed.

33. A recording method according to claim 27 wherein the thinning and the interpolation of pixels at the end of a boundary area of adjacent images are conducted when the image is formed in the plurality of runs.

34. A recording method according to any one of claims 27 through 29 further comprising the step of:

selecting an image signal to be controlled in accordance with the recording medium.

35. A recording apparatus according to claim 34 further comprising the step of:

controlling a pulse width of a drive pulse of the recording head on accordance with the recording medium to control the amount of discharge of the ink from the recording head.

36. A recording apparatus comprising:

recording means having a nozzle line comprising a plurality of nozzles arranged along a sub-scan direction for recording a band having a record width corresponding to a length of the nozzle line onto a recording medium in accordance with an input image signal by discharging ink from said nozzles along a main scan direction orthogonal to the sub-scan direction;

transport means for intermittently transporting the recording medium in the sub-scan direction; and control means for controlling the drive of said recording means and said transport means;

said control means setting a transport distance of the recording medium by said transport means to a distance smaller than the record width when the image to be recorded on the recording medium comprises a plurality of bands;

each of the bands having at least one end having an image pattern complement to an image pattern at an end of adjacent band along the sub-scan direction; and the length of the end in the sub-scan direction being equal to a difference between the record width and the transport distance, wherein the entire area in which ends of two adjacent bands along the sub-scan direction overlap is recorded by at least two scans of said recording means, and wherein said control means determines at least one of the width of the boundary area, the pixel pattern to be recorded in one scan and the density of the boundary area based on the input image signal or the count of the image input signal.

37. A recording apparatus according to claim 36 wherein said recording means is for color recording and has recording heads one for each of a plurality of colors, and said control means determines at least one of the width of the boundary area, the pixel patterns to be recorded in one scan and the density of the boundary area based on the color of the band to be recorded.

38. A recording apparatus according to claim 37 wherein said control means determines at least one of the width of the boundary area, the pixel patterns to be recorded in one scan and the density of the boundary area based on the type of the recording medium.

39. A recording apparatus according to claim 38 wherein the density of the boundary area has a density gradient in a predetermined direction from the end of the boundary area of bands.

40. A recording apparatus according to claim 39 wherein said recording means uses an electro-thermal transducer element for causing film boiling in the ink as energy generation means to discharge the ink.

41. An information processing system having a recording apparatus according to claim 36 as output means.

42. An information processing system according to claim 41 wherein said information processing apparatus is a copying apparatus comprising:

read means for reading a document sheet; and image processing means for processing the image data read by said image read means.

43. A recording method applied to a recording apparatus comprising recording means having a nozzle line comprising a plurality of nozzles arranged along a sub-scan direction for recording a band having a record width corresponding to a length of the nozzle line onto a recording medium in accordance with an input image signal by discharging ink from said nozzles along a main scan direction orthogonal to the sub-scan direction, transport means for intermittently transporting the recording medium in the sub-scan direction, and control means for controlling the drive of said recording means and said transport means, said method comprising the steps of:

setting a transport distance of the recording medium by said transport means to a distance smaller than the record width when the image to be recorded on the recording medium comprises a plurality of bands;

rendering each of the bands to have at least one end having an image pattern complement to an image pattern at an end of an adjacent band along the sub-scan direction; and making the length of the end in the sub-scan direction to be equal to a difference between the record width and the transport distance;

recording the entire area in which ends of two adjacent bands along the sub-scan direction overlap by at least two scans of said recording means; and determining at least one of the width of the boundary area, the pixel pattern to be recorded in one scan and the density of the boundary area based on the input image signal or the count of the image input signal.

44. A recording method according to claim 43 wherein said recording means is for color recording and has recording heads one for each of a plurality of colors, and said method further comprising the step of:

determining at least one of the width of the boundary area, the pixel patterns to be recorded in one scan and the density of the boundary area based on the color of the band to be recorded.

45. A recording method according to claim 44 further comprising the step of:

determining at least one of the width of the boundary area, the pixel patterns to be recorded in one scan and the density of the boundary area based on the type of the recording medium.

46. A recording method according to claim 45 wherein the density of the boundary area has a density gradient in a predetermined direction from the end of the boundary area of bands.

47. A recording method according to claim 46 wherein said recording means uses an electro-thermal transducer element for causing film boiling in the ink as energy generation means to discharge the ink.

* * * * *

UNITED STATES PATENT AND TRADEMARK OFFICE
CERTIFICATE OF CORRECTION

PATENT NO.   : 5,847,721

DATED        : December 8, 1998

INVENTOR(S)  : NOBUHIKO OGATA, ET AL.

It is certified that error appears in the above-identified patent and that said Letters Patent is hereby corrected as shown below:

COLUMN 2

Line 14, "d Δd," should read --d + Δd,--.

COLUMN 4

Line 48, "which" should read --which is--.
   Line 65, "if" should read --of--.

COLUMN 5

Line 30, "as" should read --a--.
   Line 36, "driver.58" should read --driver 58--, and "drive" should read --drives--.

COLUMN 7

Line 14, "●the" should read --●, the--.

COLUMN 9

Line 5, "91ddenote" should read --91d denote--.
   Line 8, "91gand" should read --91g and--.
   Line 26, "method" should read --methods--.

UNITED STATES PATENT AND TRADEMARK OFFICE
CERTIFICATE OF CORRECTION

PATENT NO. : 5,847,721

DATED : December 8, 1998

INVENTOR(S) : NOBUHIKO OGATA, ET AL.

It is certified that error appears in the above-identified patent and that said Letters Patent is hereby corrected as shown below:

COLUMN 10

Line 53, "(c)" should read --73--.

COLUMN 12

Line 8, "suppress" should read --suppresses--.

COLUMN 13

Line 13, "do" should read --does--.
    Line 15, "does" should read --do--.

COLUMN 16

Line 50, "equals" should read --equal--.

COLUMN 20

Line 42, "FIG. 37" should read --¶ FIG. 37--.

UNITED STATES PATENT AND TRADEMARK OFFICE
CERTIFICATE OF CORRECTION

PATENT NO. : 5,847,721

DATED : December 8, 1998

INVENTOR(S) : NOBUHIKO OGATA, ET AL.

It is certified that error appears in the above-identified patent and that said Letters Patent is hereby corrected as shown below:

COLUMN 24

Line 44, "apparatus" should read --method--.
    Line 45, "35 through 29," should read --27 through 29,--.
    Line 58, "apparatus" should read --method--.

Signed and Sealed this

Tenth Day of August, 1999

Attest:

Q. TODD DICKINSON

*Attesting Officer*     *Acting Commissioner of Patents and Trademarks*